United States Patent
Srinivasan et al.

(10) Patent No.: US 9,106,098 B2
(45) Date of Patent: Aug. 11, 2015

(54) FUEL CELL SYSTEM WITH GRID INDEPENDENT OPERATION AND DC MICROGRID CAPABILITY

(75) Inventors: Ramesh Srinivasan, Bangalore (IN); Rajaram Swaminathan, Bangalore (IN); Ranganathan Gurunathan, Bagalore (IN); Arne Ballantine, Palo Alto, CA (US); James McElroy, Suffield, CT (US)

(73) Assignee: BLOOM ENERGY CORPORATION, Sunnyvale, CA (US)

( * ) Notice: Subject to any disclaimer, the term of this patent is extended or adjusted under 35 U.S.C. 154(b) by 245 days.

(21) Appl. No.: 13/295,527

(22) Filed: Nov. 14, 2011

(65) Prior Publication Data

US 2012/0146587 A1 Jun. 14, 2012

Related U.S. Application Data

(60) Provisional application No. 61/413,629, filed on Nov. 15, 2010.

(51) Int. Cl.
| | |
|---|---|
| *H02J 7/00* | (2006.01) |
| *H02J 1/10* | (2006.01) |
| *H02J 1/14* | (2006.01) |
| *H02J 3/32* | (2006.01) |
| *H02J 7/34* | (2006.01) |
| *H01M 8/04* | (2006.01) |
| *H01M 10/44* | (2006.01) |
| *H01M 10/46* | (2006.01) |

(52) U.S. Cl.
CPC ............ *H02J 1/108* (2013.01); *H01M 8/04619* (2013.01); *H01M 8/04947* (2013.01); *H01M 10/44* (2013.01); *H02J 1/14* (2013.01); *H02J 3/32* (2013.01); *H02J 7/34* (2013.01); *H01M 10/46* (2013.01); *H01M 2250/20* (2013.01); *Y02E 60/50* (2013.01); *Y02T 90/32* (2013.01)

(58) Field of Classification Search
CPC .......................................................... H02J 7/34
USPC ........... 320/101, 138, 109; 307/43, 64, 18, 66
See application file for complete search history.

(56) References Cited

U.S. PATENT DOCUMENTS

| | | | | |
|---|---|---|---|---|
| 6,614,204 | B2 * | 9/2003 | Pellegrino et al. | 320/109 |
| 6,812,587 | B2 * | 11/2004 | Gilbreth et al. | 290/52 |
| 7,061,139 | B2 * | 6/2006 | Young et al. | 307/45 |
| 7,705,490 | B2 | 4/2010 | Srinivasan et al. | |
| 7,713,649 | B2 | 5/2010 | Hickey et al. | |
| 2003/0111842 | A1 | 6/2003 | Gilbreth et al. | |

(Continued)

FOREIGN PATENT DOCUMENTS

KR 10-2009-0085973 A 8/2009

OTHER PUBLICATIONS

International Search Authority/Korean Intellectual Property Office (ISA/KR). International Search Report and Written Opinion, PCT Application No. PCT/US11/60604. May 25, 2012.

*Primary Examiner* — Richard Isla Rodas
*Assistant Examiner* — Nathaniel Pelton
(74) *Attorney, Agent, or Firm* — The Marbury Law Group PLLC

(57) ABSTRACT

A fuel cell system includes grid independent operation with DC microgrid capability. This fuel cell system has a capability of operation with and without the grid, and with DC micro-grid capability.

12 Claims, 20 Drawing Sheets

(56) References Cited

U.S. PATENT DOCUMENTS

| | | | |
|---|---|---|---|
| 2004/0053082 A1* | 3/2004 | McCluskey et al. | 429/9 |
| 2004/0164702 A1* | 8/2004 | Holmes | 320/101 |
| 2004/0169489 A1* | 9/2004 | Hobbs | 320/104 |
| 2008/0040479 A1* | 2/2008 | Bridge et al. | 709/224 |
| 2008/0042615 A1* | 2/2008 | Serrels et al. | 320/101 |
| 2008/0053716 A1* | 3/2008 | Scheucher | 180/2.1 |
| 2008/0067869 A1 | 3/2008 | Evans et al. | |
| 2009/0030712 A1* | 1/2009 | Bogolea et al. | 705/1 |
| 2009/0115375 A1* | 5/2009 | Iida | 320/138 |
| 2009/0273240 A1* | 11/2009 | Gurunathan et al. | 307/64 |
| 2010/0013317 A1 | 1/2010 | Ballantine et al. | |
| 2010/0141205 A1* | 6/2010 | Tyler et al. | 320/109 |
| 2010/0188869 A1 | 7/2010 | Fredette et al. | |
| 2010/0228411 A1* | 9/2010 | Saito | 701/22 |
| 2010/0239924 A1 | 9/2010 | McElroy et al. | |
| 2011/0008687 A1 | 1/2011 | Ballantine et al. | |
| 2011/0011362 A1 | 1/2011 | Sridhar et al. | |
| 2011/0055037 A1* | 3/2011 | Hayashigawa et al. | 705/26.1 |
| 2011/0258112 A1* | 10/2011 | Eder et al. | 705/39 |
| 2011/0281185 A1 | 11/2011 | Sridhar et al. | |
| 2012/0041855 A1* | 2/2012 | Sterling et al. | 705/34 |
| 2012/0091964 A1* | 4/2012 | Vance et al. | 320/122 |
| 2013/0020875 A1* | 1/2013 | Wozniak et al. | 307/72 |

* cited by examiner

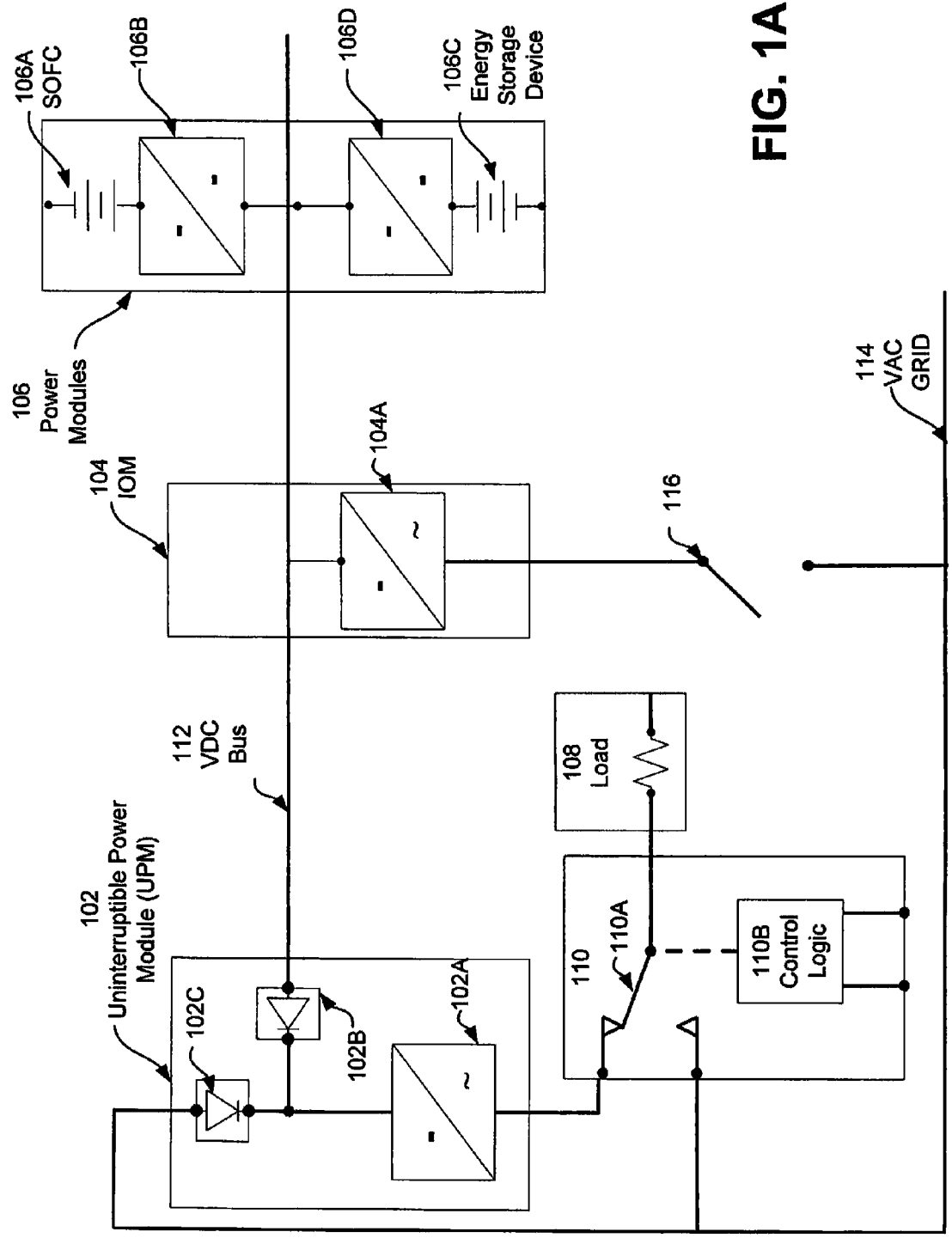

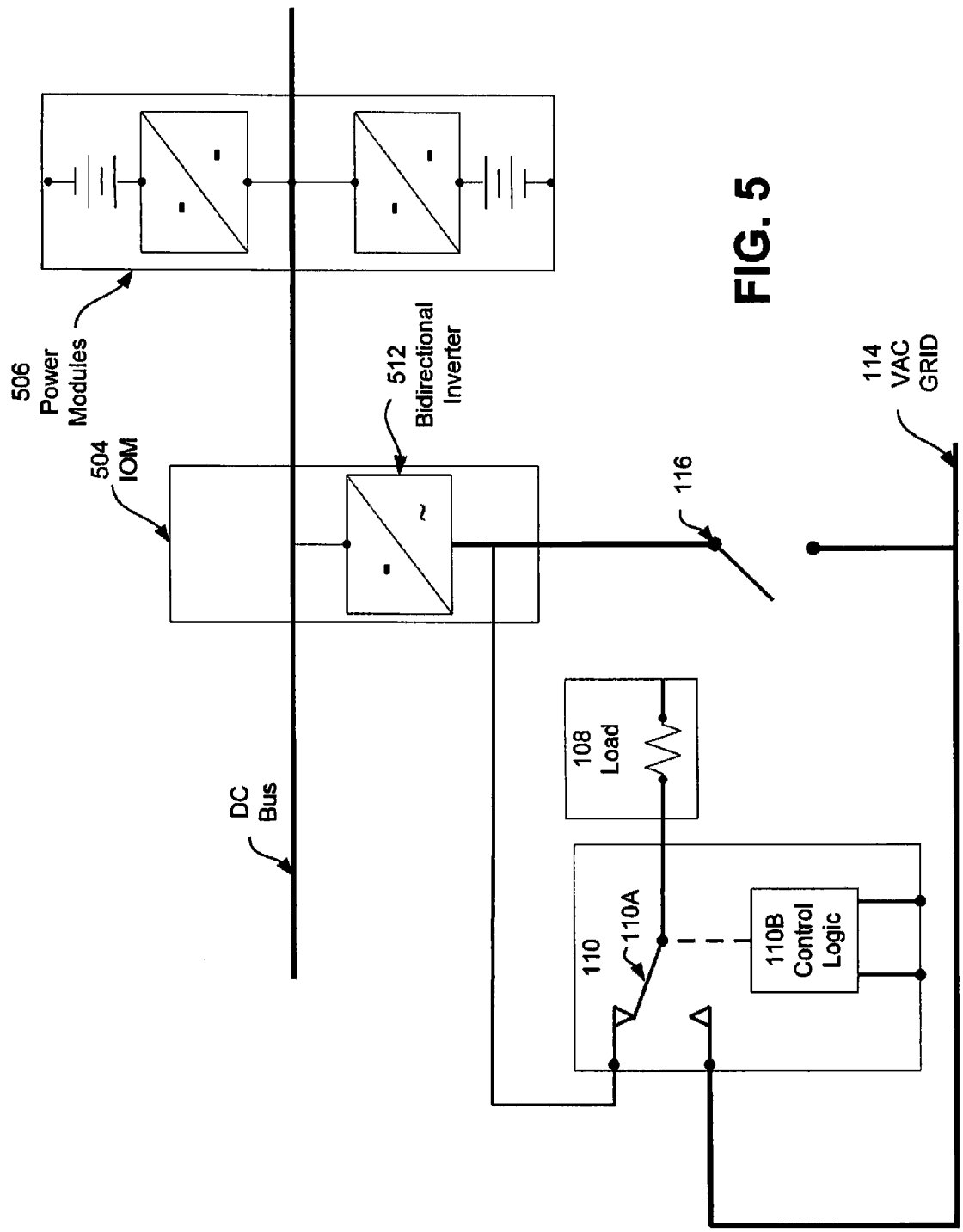

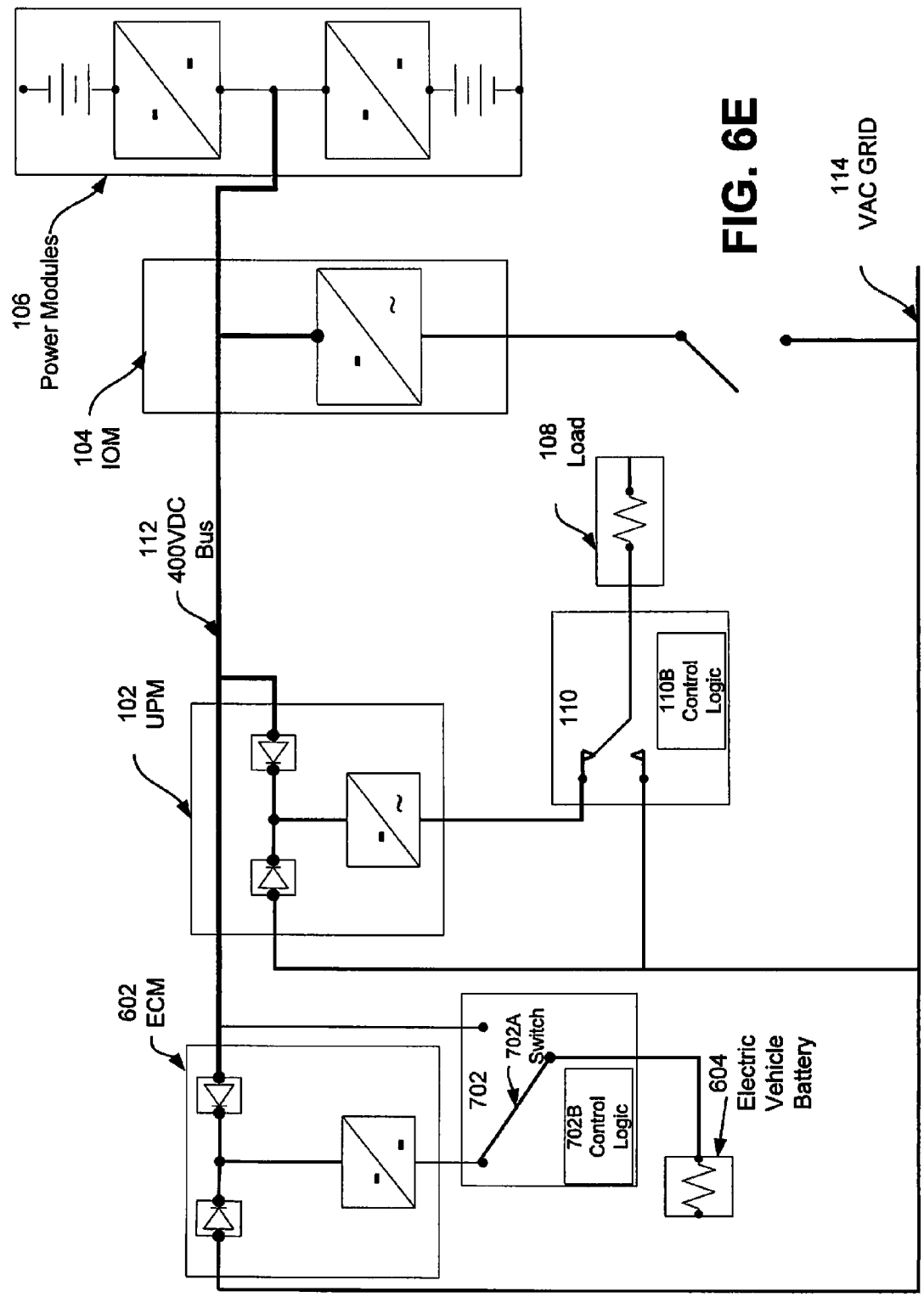

FUEL CELL SYSTEM WITH GRID INDEPENDENT OPERATION AND DC MICROGRID CAPABILITY

CROSS-REFERENCE TO RELATED PATENT APPLICATIONS

The present application claims benefit of U.S. provisional application 61/413,629, filed Nov. 15, 2010, which is incorporated herein by reference in its entirety.

BACKGROUND

Electrical power systems can be used to provide electrical power to one more loads such as buildings, appliances, lights, tools, air conditioners, heating units, factory equipment and machinery, power storage units, computers, security systems, etc. The electricity used to power loads is often received from an electrical grid. However, the electricity for loads may also be provided through alternative power sources such as fuel cells, solar arrays, wind turbines, thermo-electric devices, batteries, etc. The alternative power sources can be used in conjunction with the electrical grid, and a plurality of alternative power sources may be combined in a single electrical power system. Alternative power sources are generally combined after conversion of their DC output into an alternating current (AC). As a result, synchronization of alternative power sources is required.

In addition, many alternative power sources use machines such as pumps and blowers which run off auxiliary power. Motors for these pumps and blowers are typically 3-phase AC motors which may require speed control. If the alternative power source generates a direct current (DC), the direct current undergoes several states of power conversion prior to delivery to the motor(s). Alternatively, the power to the motors for pumps, blowers, etc. may be provided using the electrical grid, an inverter, and a variable frequency drive. In such a configuration, two stages of power conversion of the inverter are incurred along with two additional stages of power conversion for driving components of the AC driven variable frequency drive. In general, each power conversion stage that is performed adds cost to the system, adds complexity to the system, and lowers the efficiency of the system.

Operating individual distributed generators such as fuel cell generators both with and without a grid reference and in parallel with each other without a grid reference is problematic in that switch-over from current source to voltage source must be accommodated. Additionally, parallel control of many grid independent generators can be problematic.

To address the mode mode-switch-over issue, a double-inverter arrangement may be utilized. This allows one inverter to be used in grid tie and a second inverter to be used with the stand-alone load. An exemplary double-inverter arrangement with a load dedicated inverter that is located internally in an input/output module of a solid oxide fuel cell (SOFC) system is described in U.S. patent application Ser. No. 12/149,488 (filed May 2, 2008 and entitled "Uninterruptible Fuel Cell System"), the disclosure of which is incorporated herein by reference in its entirety for all purposes.

Another approach is to drop power for 5-10 cycles to switch modes. If a single inverter is used, a time of 5-10 cycles would be required to drop grid tie and establish voltage mode control.

Yet another approach is to use frequency droop to control the amount of power sharing in grid tied export or in load stand alone output control.

SUMMARY

Embodiments are generally directed to architectures and methods in which an uninterruptable power module (UPM) comprises a load-dedicated inverter. The UPM is preferably externally located with respect to the SOFC system power and input/output modules and may be placed adjacent to the UPM modules of other SOFC systems. These may then be readily controlled in parallel with each other with the stand-alone load.

In a first embodiment, a fuel cell system comprises a power module comprising at least one fuel cell segment, an input output module comprising at least one first inverter, and an uninterruptible power module comprising at least one second inverter. The power module comprises a first housing, the input output module comprises a second housing which is separate from the first housing, and the uninterruptible power module comprises a third housing which is separate from the first and the second housings.

In a second embodiment, the at least one fuel cell segment is electrically connected in parallel to the at least one first inverter and the at least one second inverter, the at least one first inverter is electrically connected to a load through an electrical grid, and the at least one second inverter is electrically connected to the load without using the electrical grid.

In a third embodiment of the invention, the output of the SOFC power modules are paralleled at the DC-output point, and a DC bus is created. This DC bus forms a DC micro grid connecting any number of SOFC systems together. The UPM may be a large assembly capable of output of many multiples of the output of the SOFC systems themselves.

In a fourth embodiment, a fuel cell system is operated with an electric vehicle (EV) charging module (ECM) to charge EV batteries.

Additional alternative embodiments are also described.

DESCRIPTION OF THE DRAWINGS

FIG. 1A is a block diagram illustrating a system according to an embodiment.

FIGS. 1B to 1K illustrate the system of FIG. 1A in various modes of operation.

FIG. 5 is a block diagram illustrating an IOM comprising an inverter that is configured for dual mode functionality according to an embodiment.

FIGS. 6A-6E illustrate various modes of operation of the system of the type shown in FIG. 1A. to provide power to an electric vehicle (EV) charging station according to embodiments.

DETAILED DESCRIPTION

Figure 1B:
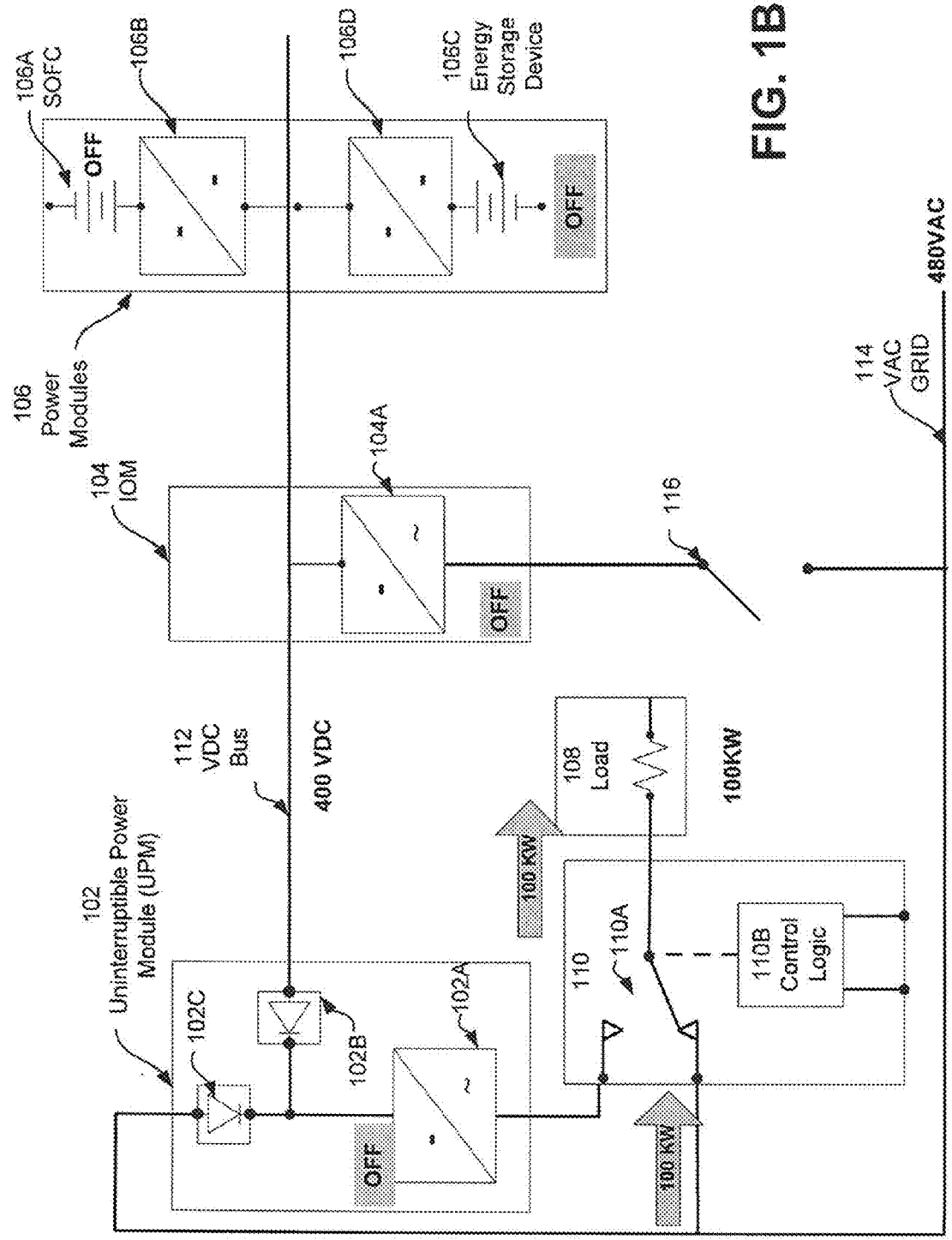

Referring to FIG. 1, a fuel cell system according to an embodiment includes a UPM 102, an input/output module (IOM) 104 and one or more power modules 106. The power module 106 comprises a first housing, the IOM 104 comprises a second housing which is separate from the first housing, and the uninterruptible power module 102 comprises a third housing which is separate from the first and the second housings. If there is more than one power module 106, for example six to ten modules 106, then each power module may comprise its own housing. Each housing may comprise a cabinet or another type of full or partial enclosure, for example the cabinet described in U.S. application Ser. No. 12/458,355, filed on Jul. 8, 2009 and incorporated herein by reference in its entirety. The modules may be arranged in one or more rows or in other configurations.

The UPM 102 includes at least one DC/AC inverter 102A. If desired, an array of inverters may be used. Any suitable inverter known in the art may be used. The UPM 102 optionally contains an input rectifier, such as an input diode 102B which connects to the output of a DC bus 112 from the power module(s) 106 and to the input of the at least one inverter 102A. The UPM also optionally contains a boost PFC rectifier 102C which connects to the output the electric grid 114, such as a utility grid, and to the input of the at least one inverter 102A.

The IOM 104 may comprise one or more power conditioning components. The power conditioning components may include components for converting DC power to AC power, such as a DC/AC inverter 104A (e.g., a DC/AC inverter described in U.S. Pat. No. 7,705,490, incorporated herein by reference in its entirety), electrical connectors for AC power output to the grid, circuits for managing electrical transients, a system controller (e.g., a computer or dedicated control logic device or circuit), etc. The power conditioning components may be designed to convert DC power from the fuel cell modules to different AC voltages and frequencies. Designs for 208V, 60 Hz; 480V, 60 Hz; 415V, 50 Hz and other common voltages and frequencies may be provided.

Each power module 106 cabinet is configured to house one or more hot boxes. Each hot box contains one or more stacks or columns of fuel cells 106A (generally referred to as "segments"), such as one or more stacks or columns of solid oxide fuel cells having a ceramic oxide electrolyte separated by conductive interconnect plates. Other fuel cell types, such as PEM, molten carbonate, phosphoric acid, etc. may also be used.

Fuel cells are often combined into units called "stacks" in which the fuel cells are electrically connected in series and separated by electrically conductive interconnects, such as gas separator plates which function as interconnects. A fuel cell stack may contain conductive end plates on its ends. A generalization of a fuel cell stack is the so-called fuel cell segment or column, which can contain one or more fuel cell stacks connected in series (e.g., where the end plate of one stack is connected electrically to an end plate of the next stack). A fuel cell segment or column may contain electrical leads which output the direct current from the segment or column to a power conditioning system. A fuel cell system can include one or more fuel cell columns, each of which may contain one or more fuel cell stacks, such as solid oxide fuel cell stacks.

The fuel cell stacks may be internally manifolded for fuel and externally manifolded for air, where only the fuel inlet and exhaust risers extend through openings in the fuel cell layers and/or in the interconnect plates between the fuel cells, as described in U.S. Pat. No. 7,713,649, which is incorporated herein by reference in its entirety. The fuel cells may have a cross flow (where air and fuel flow roughly perpendicular to each other on opposite sides of the electrolyte in each fuel cell), counter flow parallel (where air and fuel flow roughly parallel to each other but in opposite directions on opposite sides of the electrolyte in each fuel cell) or co-flow parallel (where air and fuel flow roughly parallel to each other in the same direction on opposite sides of the electrolyte in each fuel cell) configuration.

Power modules may also comprise other generators of direct current, such as solar cell, wind turbine, geothermal or hydroelectric power generators.

The segment(s) 106A of fuel cells may be connected to the DC bus, 112 such as a split DC bus, by one or more DC/DC converters 106B located in module 106. The DC/DC converters 106B may be located in the IOM 104 instead of the power module 106.

The power module(s) 106 may also optionally include an energy storage device 106C, such as a bank of supercapacitors or batteries. Device 106C may also be connected to the DC bus 112 using one or more DC/DC converters 106D.

The UPM 102 is connected to an input/output module (IOM) 104 via the DC bus 112. The DC bus receives power from power modules 106.

The fuel cell system and the grid 114 are electrically connected to a load 108 using a control logic unit 110. The load may comprise any suitable load which uses AC power, such as one or more buildings, appliances, lights, tools, air conditioners, heating units, factory equipment and machinery, power storage units, computers, security systems, etc. The control logic unit includes a switch 110A and control logic 110B, such as a computer, a logic circuit or a dedicated controller device. The switch may be an electrical switch (e.g., a switching circuit) or an electromechanical switch, such as a relay.

Control logic 110B routes power to the load 108 either from the UPM 102 or from the grid 114 using switch 110A. The at least one fuel cell segment 106A and storage device 106C from module 106 are electrically connected in parallel to the at least one first inverter 104A in IOM and to the at least one second inverter 102A in the UPM 102. The at least one first inverter 104A is electrically connected to the load 108 through the electrical grid 114 using switch 110A in the first position. In contrast to the circuit shown in U.S. patent application Ser. No. 12/149,488 (filed May 2, 2008 and entitled "Uninterruptible Fuel Cell System"), the grid 114 in FIG. 1A is directly connected to the load 108 through the control logic unit 110 without passing through a bidirectional inverter. The at least one second inverter 102A is electrically connected to the load 108 with the switch 110A in the second position without using the electrical grid 114 (i.e., the output of the fuel cell segment 106A does not have to pass through the grid 114 to reach the load 108).

Thus, the control logic 110B selects whether to provide power to the load from the electrical grid 114 (or from the fuel cell segment 106A through the grid) or through the at least one second inverter 102A. The control logic 110B may determine a state of the power modules and select a source to power the load 108 based on the state of the power modules, as described below.

A second switch 116 controls the electrical connection between the IOM 104 and the grid 114. Switch 116 may controlled by the control logic 110B or by another system controller.

By way of illustration and not by way of limitation, the system contains the following electrical paths:

A path to the load 108 from the AC grid 114.

A path from the AC grid 114 through the IOM 104 to storage elements 106C of power modules 106 (for example, supercapacitors or batteries).

A path from the storage elements 106C of the power modules 106, over the DC bus 112 to the IOM 104 and the UPM 102 in parallel. The DC bus delivers DC to the inverter in the UPM 102. The inverter 102A in the UPM 102 or inverter 104A in IOM 104 delivers AC power to the load 108 depending on the position of the switch 110A.

A path from the power modules 106 (which may include power from the fuel cell segment(s) 106A and/or the storage elements 106C of the power modules 106), over the DC bus 112 to the IOM 104 and the UPM 102. The DC bus delivers DC voltage to the inverter in the UPM 102. The inverter 102A in the UPM 102 delivers AC power to the load 108. Power in excess of the power required by the load 108 is delivered to the AC grid through an inverter 104A in the IOM 104. The amount of power that is delivered to the AC grid 114 will vary according the demands of the load 108. If the amount of power required by the load 108 exceeds the power provided by the power modules 106, the additional power demand may be supplied by the AC grid 114 directly to the load 108 through switch 110A in the first position or to the UPM 102 with the switch 110A in the second position. The grid power is rectified in rectifier 102C in UPM 102 and provided to the inverter 102A in the UPM 102 and converted back to AC for powering the load 108.

FIGS. 1B-1K illustrate various modes of operation of the system shown in FIG. 1A. While the embodiments described below illustrate a load 108 which requires 100 kW of power and the fuel cell segment(s) 106A which output 200 kW of power in steady state, these values are provided for illustration only and any other suitable load and power output values may be used.

FIG. 1B illustrates the system operation during the installation of the system and/or during a period when the load 108 receives power from the grid 114. As shown in this figure, the fuel cell segment(s) 106A and the energy storage device 106C are in the OFF state, the IOM 104 inverter 104A and the UPM inverter 102A are both in the OFF state and the second switch 116 is open such that there is no electrical communication between the IOM and the grid. The control logic switch 110A is in the first position to provide power from the grid 114 to the load 108 through the control logic module 110. As shown in the figure, 100 kW of power is provided from the grid to the load through the control logic module.

Figure 1C:
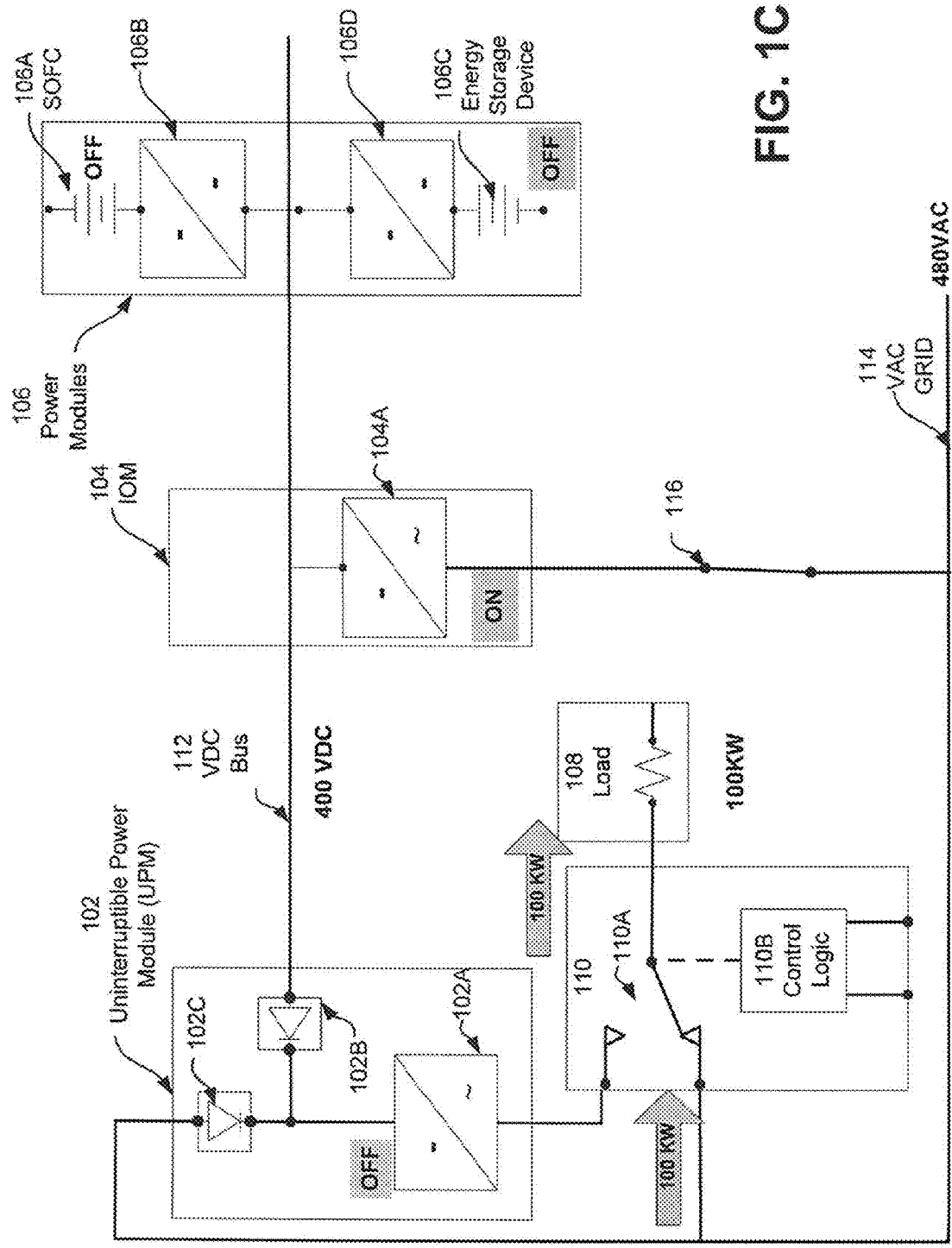

FIG. 1C illustrates the system operation during IOM start-up and charging of the energy storage device (e.g., bank of supercapacitors) 106C from the grid 114 while the load 108 receives power from the grid 114. As shown in this figure, the fuel cell segment(s) 106A are in the OFF state while the energy storage device 106C is in the ON state. The IOM 104 bi-directional inverter 104A is in the ON state and the UPM inverter 102A is in the OFF state. The second switch 116 is closed such that there is electrical communication between the IOM and the grid to provide power from the grid 114 to the energy storage device 106C through the IOM 104 inverter 104A and the DC bus 112. The control logic switch 110A is in the first position to provide power from the grid 114 to the load 108 through the control logic module 110. As shown in the figure, 100 kW of power is provided from the grid to the load through the control logic module.

Figure 1D:
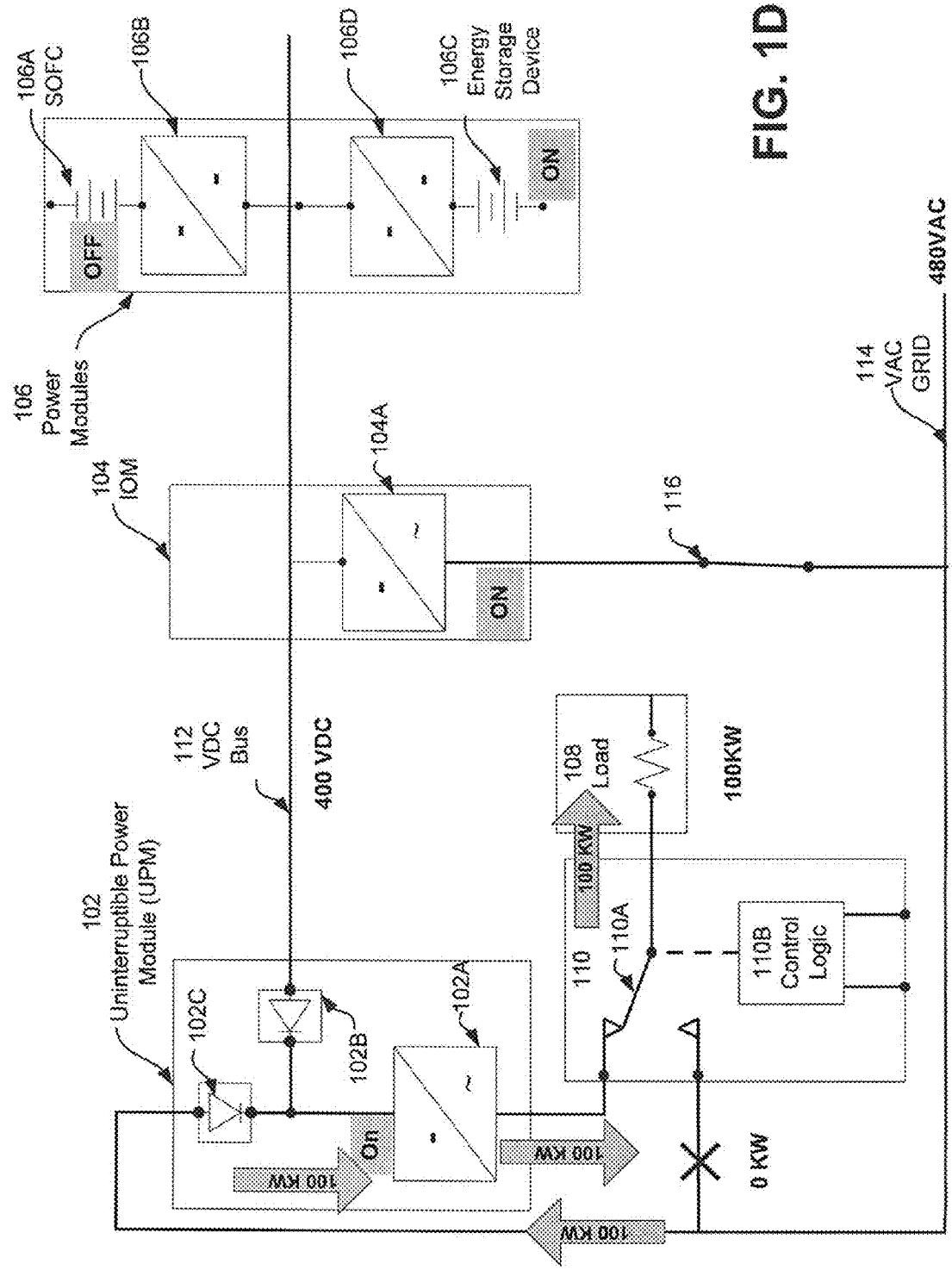

FIG. 1D illustrates the system operation during UPM start-up following IOM start-up. UPM functions by receiving power from the energy storage device 106C. UPM provides the power from the energy storage device 106C to the load 108. As shown in this figure, the fuel cell segment(s) 106A are in the OFF state and the energy storage device 106C is in the ON state. The IOM 104 bi-directional inverter 104A is in the ON state and the UPM inverter 102A is in the ON state. The second switch 116 is closed such that there is electrical communication between the IOM and the grid. The control logic switch 110A is in the second position to provide power from the UPM 102 to the load 108 through the control logic module 110. As shown in the figure, 100 kW of power is provided from the grid 114 to the load 108 through the rectifier 102C and inverter 102A of the UPM 102 and then through the control logic module. Some power may also be provided to the load 108 from the energy storage device 106C via the DC bus 112, UPM 102 and control logic module.

Figure 1E:
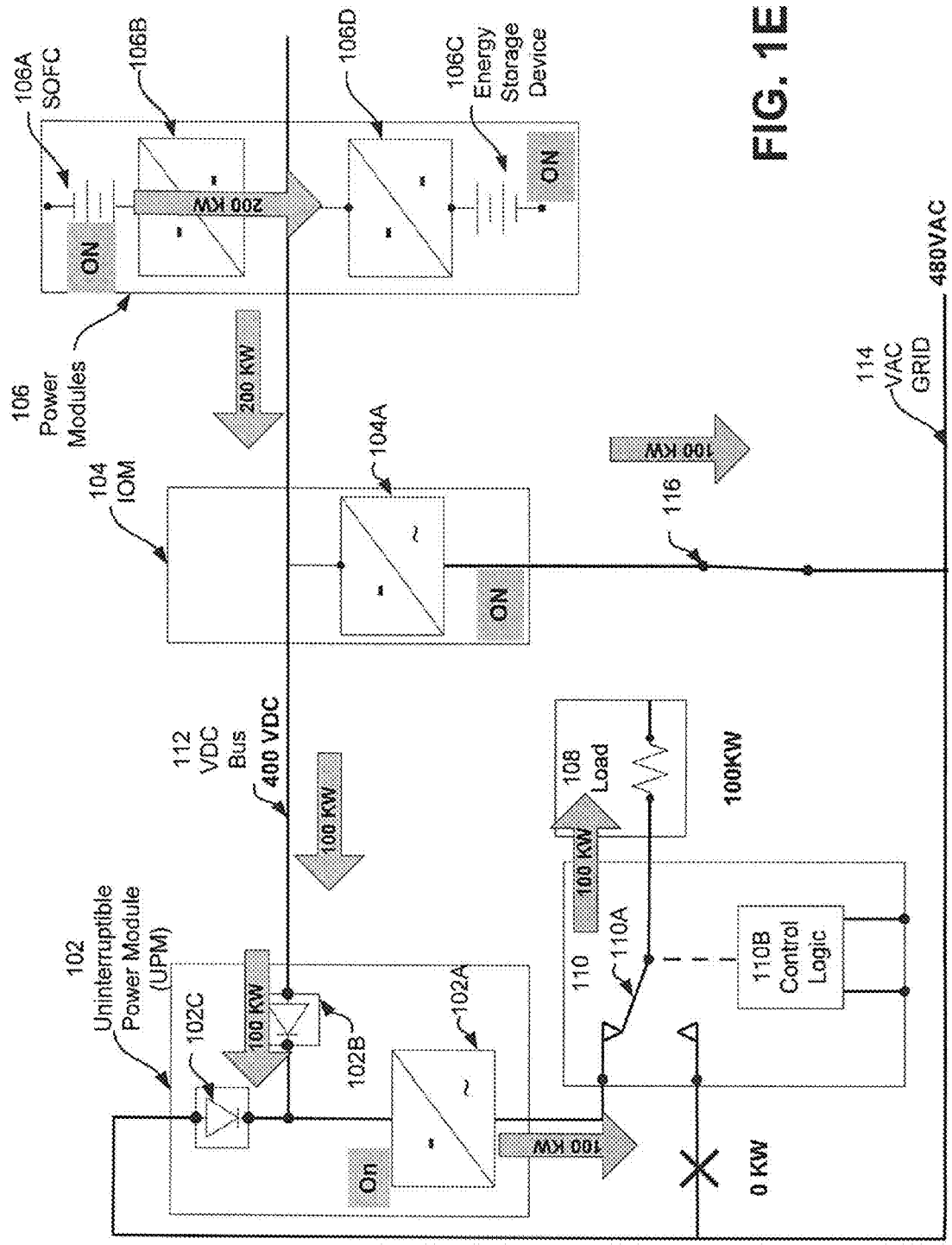

FIG. 1E illustrates the steady state operation of the system. In this mode the fuel cell segment(s) 106A is in the ON state to power the load 108. The segment(s) 106A may provide 200 kW of power in a steady state mode (this may be the designed power output or a maximum power output). As shown in this figure, the energy storage device 106C is in the ON state to act as an emergency backup power source. The IOM 104 bi-directional inverter 104A is in the ON state and the UPM inverter 102A is in the ON state. The 200 kW power output is split between the grid 114 and the load 108. The second switch 116 is closed such that there is electrical communication between the IOM and the grid to provide 100 kW of power from the fuel cell segment(s) 106A to the grid. The control logic switch 110A is in the second position to provide the other 100 kW of power from the fuel cell segment(s) 106A in the power module 106 through the DC bus passing through IOM 104 and through the inverter 102A of the UPM 102 and then through the control logic module 110 to the load 108. Preferably, this 100 kW of power does not pass through the IOM inverter 104A and/or the grid 114 to reach the load 108. While a 200 kW power output split 50/50 between the grid and the load is described above, different power outputs may be used as needed, such as 25 kW to 1000 kW, which may be split 10/90 to 90/10 between the grid and the load.

Figure 1F:
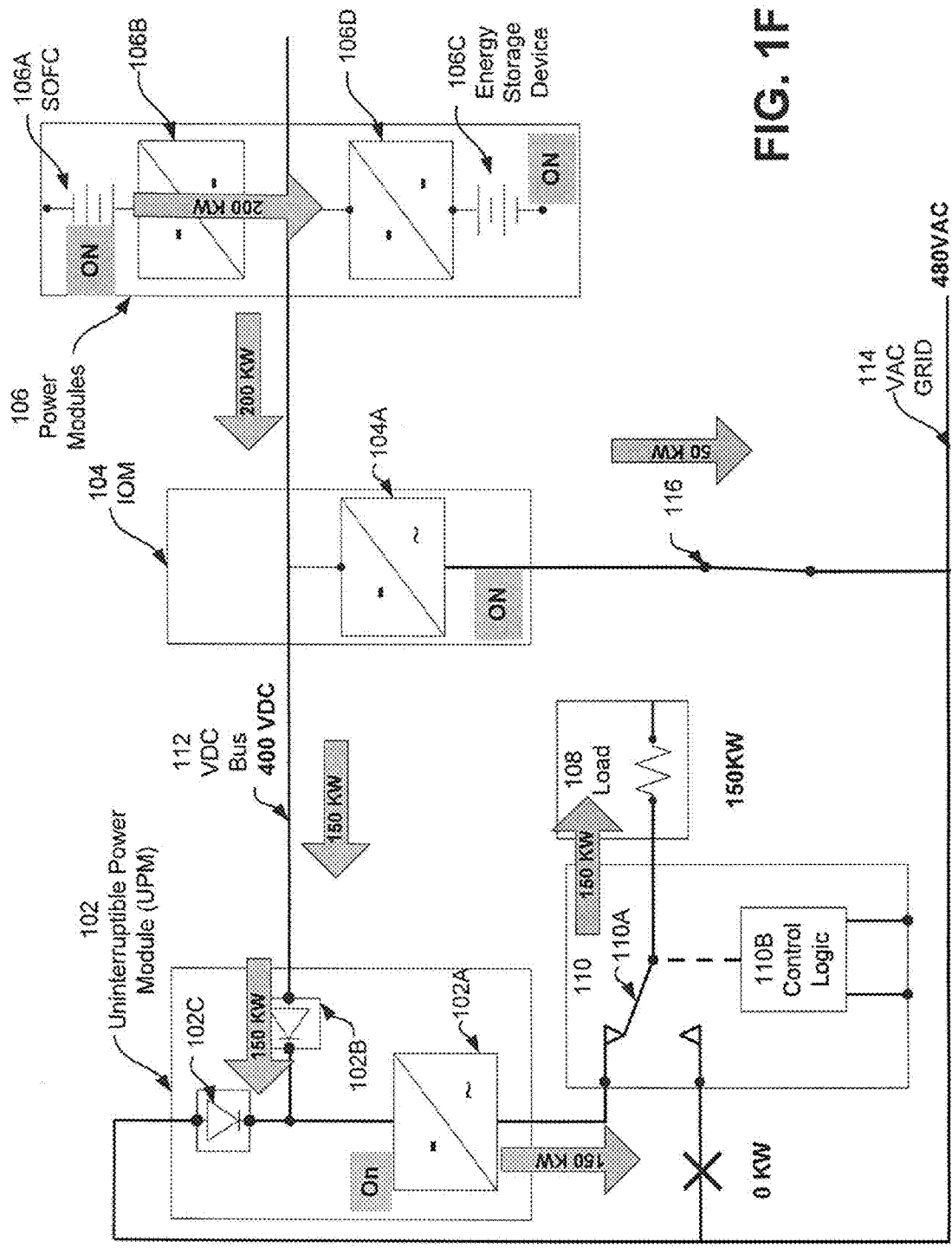

FIG. 1F illustrates operation of the system during a relatively steady load 108 increase from 100 kW to 150 kW (i.e., when the load requires more power than prior steady state operation). In this mode, more of the power output of the fuel cell segment(s) is provided to the load and less of this power output is provided to the grid than in the stead state mode described above. If desired, 100% of the power output may be provided to the load and 0% to the grid. The fuel cell segment(s) 106A is in the ON state to power the load 108. As shown in this figure, the energy storage device 106C is in the ON state to act as an emergency backup power source. The IOM 104 bi-directional inverter 104A is in the ON state and the UPM inverter 102A is in the ON state. The second switch 116 is closed such that there is electrical communication between the IOM and the grid to provide 50 kW of power from the fuel cell segment(s) 106A through the IOM inverter 104A to the grid 114. The control logic switch 110A is in the second position to provide 150 kW of power from the fuel cell segment(s) 106A in the power module 106 through the DC bus passing through IOM 104 and through the inverter 102A of the UPM 102 and then through the control logic module 110 to the load 108. Thus, the power output of the fuel cell segment(s) 106A is preferably split between the grid and the load in this mode. Preferably, the power does not pass through the IOM inverter 104A and/or the grid 114 to reach the load 108.

Figure 1G:
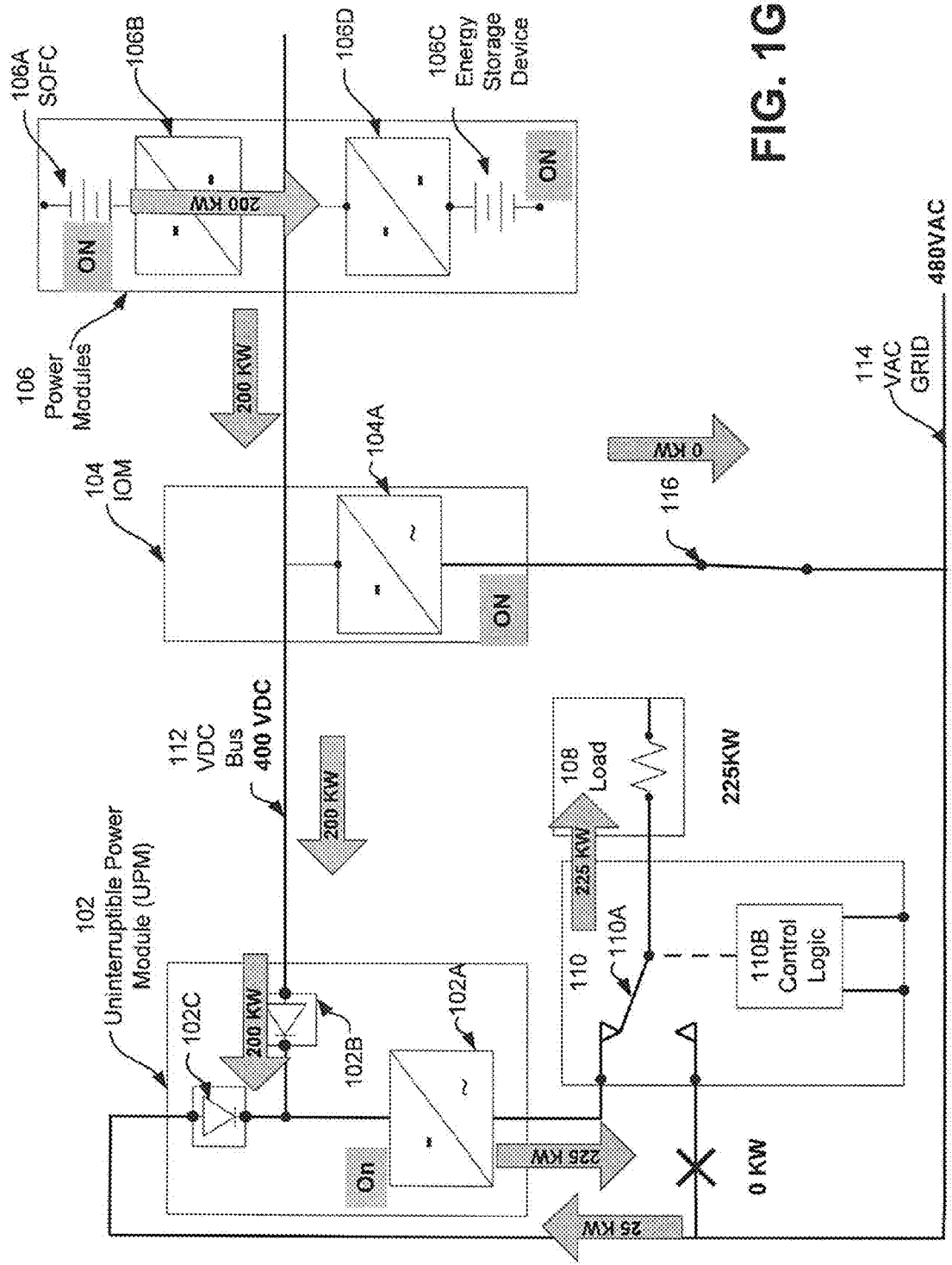

FIG. 1G illustrates operation of the system during a sudden load 108 spike which requires more power than the fuel cell segment(s) 106A can generate at that time. For example, the load spike is from 100 kW to 225 kW while the segment(s) 106A can only generate 200 kW of power in steady state or in maximum power mode. The fuel cell segment(s) 106A is in the ON state to power the load 108. As shown in this figure, the energy storage device 106C is in the ON state to act as an emergency backup power source. The IOM 104 bi-directional inverter 104A is in the ON state and the UPM inverter 102A is in the ON state. The second switch 116 is closed such that there is electrical communication between the IOM and the grid. However, no power is provided from fuel cell segment (s) 106A through the IOM inverter 104A to the grid 114 due to the load spike. The control logic switch 110A is in the second position to provide power from the fuel cell segment (s) 106A in the power module 106 and from the grid 114 through the DC bus passing through IOM 104 and through the inverter 102A of the UPM 102 and then through the control logic module 110 to the load 108. In this mode, the power to the load is provided from both the fuel cell segment(s) and the grid. As shown, 200 kW from the segment(s) 106A is provided through the DC bus 112, diode 102B, inverter 102A and switch 110A to the load 108, while 25 kW is provided from the grid 114 through the rectifier 102B, inverter 102A and switch 110A to the load 108 to achieve a total 225 kW of power required by the load. Preferably, the power from the fuel cell segment(s) does not pass through the IOM inverter 104A and/or the grid 114 to reach the load 108.

Figure 1H:
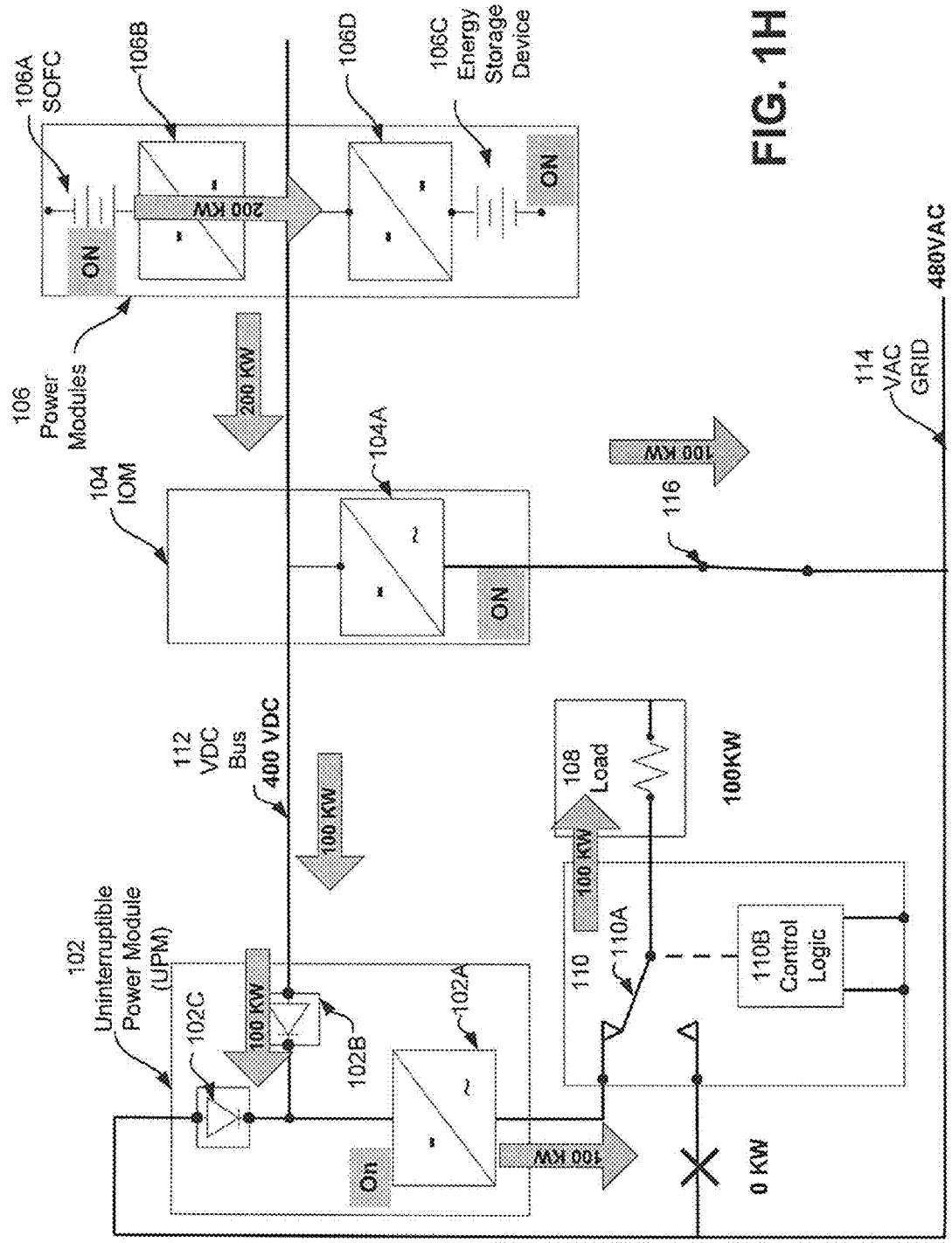
Figure 11:
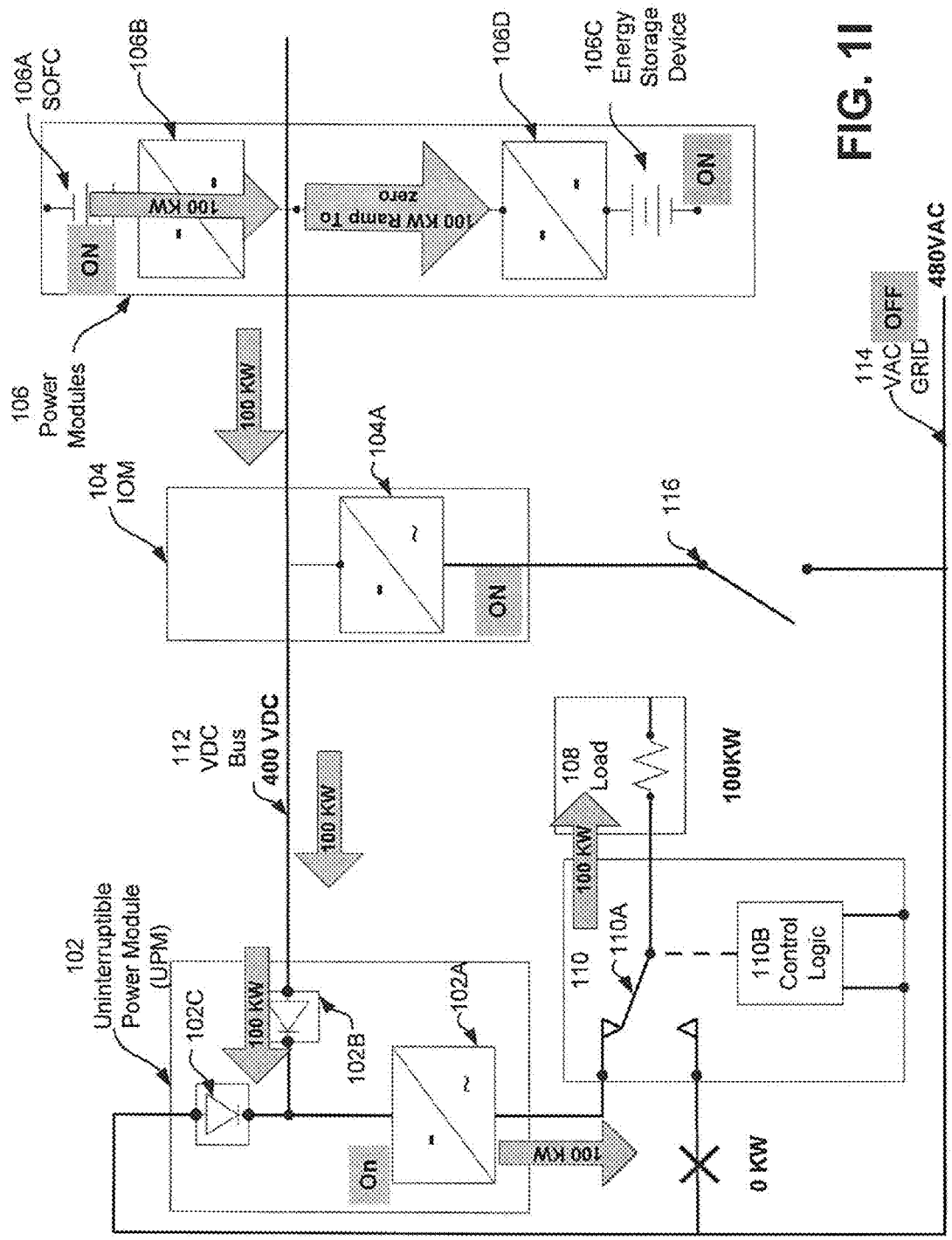

FIG. 1H illustrates operation of the system during a return to normal or steady state operation after the sudden load 108 spike. The fuel cell segment(s) 106A is in the ON state to power the load 108. As shown in this figure, the energy storage device 106C is in the ON state to act as an emergency backup power source. The IOM 104 bi-directional inverter 104A is in the ON state and the UPM inverter 102A is in the ON state. The second switch 116 is closed such that there is electrical communication between the IOM and the grid. The control logic switch 110A is in the second position to provide power from the fuel cell segment(s) 106A in the power module 106 through the DC bus passing through IOM 104 and through the inverter 102A of the UPM 102 and then through the control logic module 110 to the load 108. In this mode, the fuel cell segment(s) continue to output steady state or maximum power (e.g., 200 kW) which is split between the load and the grid. As shown, 200 kW from the segment(s) 106A is provided to the IOM 104. IOM 104 provides 100 kW of power from fuel cell segment(s) 106A through the IOM inverter 104A to the grid 114. The DC bus 112 provides the remaining 100 kW of power from IOM 104 through diode 102B, inverter 102A and switch 110A to the load 108. Preferably, the power does not pass through the IOM inverter 104A and/or the grid 114 to reach the load 108.

FIG. 1I illustrates operation of the system during loss of power from the grid 114 (e.g., during a black out). The fuel cell segment(s) 106A is in the ON state to power the load 108. As shown in this figure, the energy storage device 106C is in the ON state to absorb power from the fuel cell segment(s) 106A and to the soften the "step" that occurs during the loss of the grid power. The IOM 104 bi-directional inverter 104A is in the ON state and the UPM inverter 102A is in the ON state. The second switch 116 is opened such that there is no electrical communication between the IOM and the grid. A sensor can sense the loss of grid power and a controller can open the switch 116 in response to the sensed grid outage. The control logic switch 110A is in the second position to provide power from the fuel cell segment(s) 106A in the power module 106 through the DC bus passing through IOM 104 and through the inverter 102A of the UPM 102 and then through the control logic module 110 to the load 108. In this mode, out of the 200 kW total power output from the segment(s) 106A, 100 kW is provided to the DC bus 112 and 100 kW is provided to the energy storage device 106C to soften the step. The DC bus 112 provides the 100 kW of power from IOM 104 through diode 102B, inverter 102A and switch 110A to the load 108. The power output of the segment(s) 106A is then gradually reduced to 100 kW to meet the requirements of the load 108.

Figure 1J:
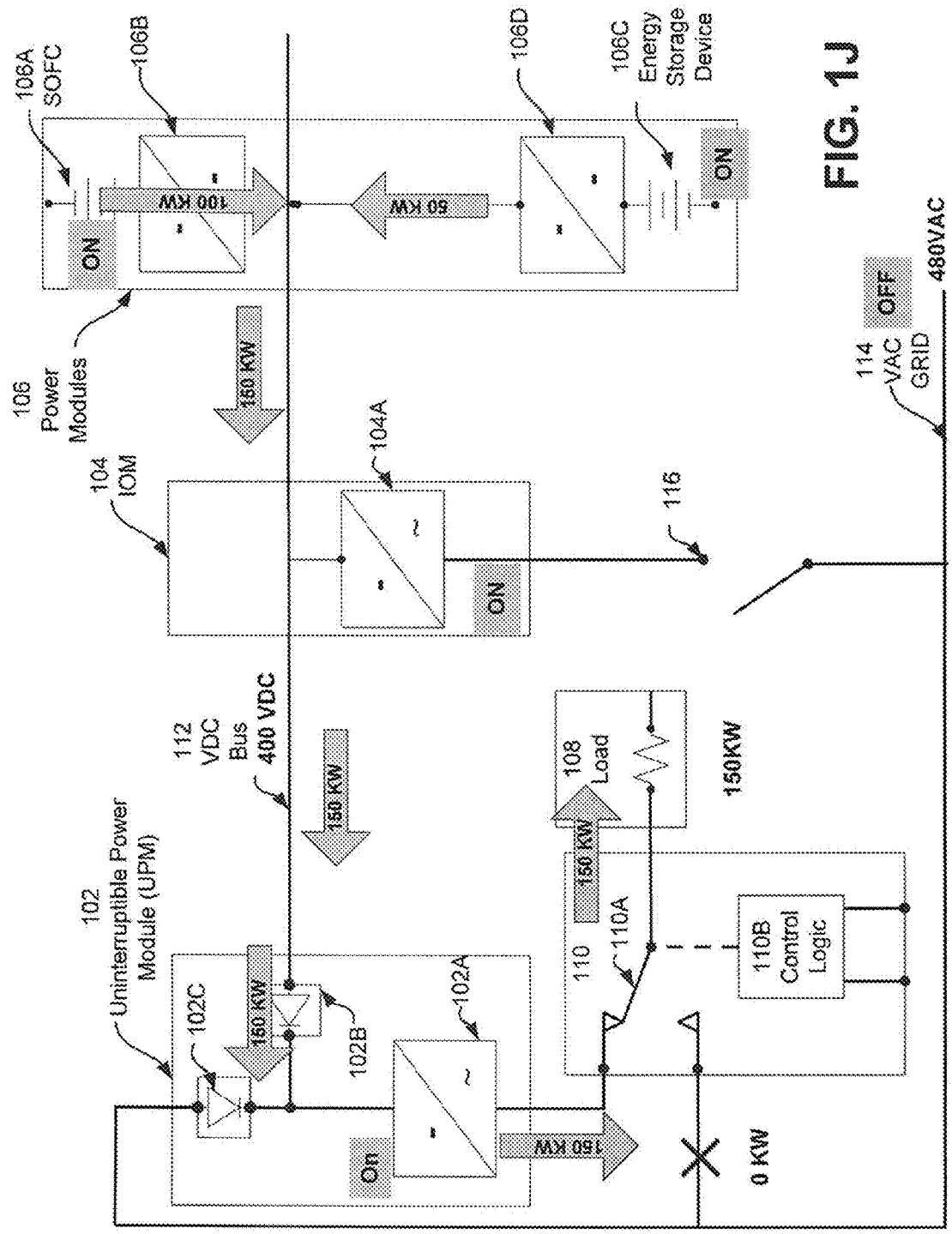

FIG. 1J illustrates operation of the system during loss of power from the grid 114 (e.g., during a black out) and in case of a load transient (e.g., increased demand for power from load 108) while the fuel cell segment(s) output a reduced amount of power (e.g., 100 kW) which meets the steady state requirements of the load. The fuel cell segment(s) 106A is in the ON state to power the load 108. As shown in this figure, the energy storage device 106C is in the ON state to provide additional power to the load 108. The IOM 104 bi-directional inverter 104A is in the ON state and the UPM inverter 102A is in the ON state. The second switch 116 is opened such that there is no electrical communication between the IOM and the grid. The control logic switch 110A is in the second position to provide power from the fuel cell segment(s) 106A and the energy storage device 106C in the power module 106 through the DC bus passing through IOM 104 and through the inverter 102A of the UPM 102 and then through the control logic module 110 to the load 108. In this mode, 100 kW from the segment(s) 106A and 50 kW from the energy storage device is provided to the DC bus 112. Thus, the DC bus 112 provides the 150 kW of power from IOM 104 through diode 102B, inverter 102A and switch 110A to the load 108. Preferably, the power does not pass through the IOM inverter 104A and/or the grid 114 to reach the load 108.

Figure 1K:
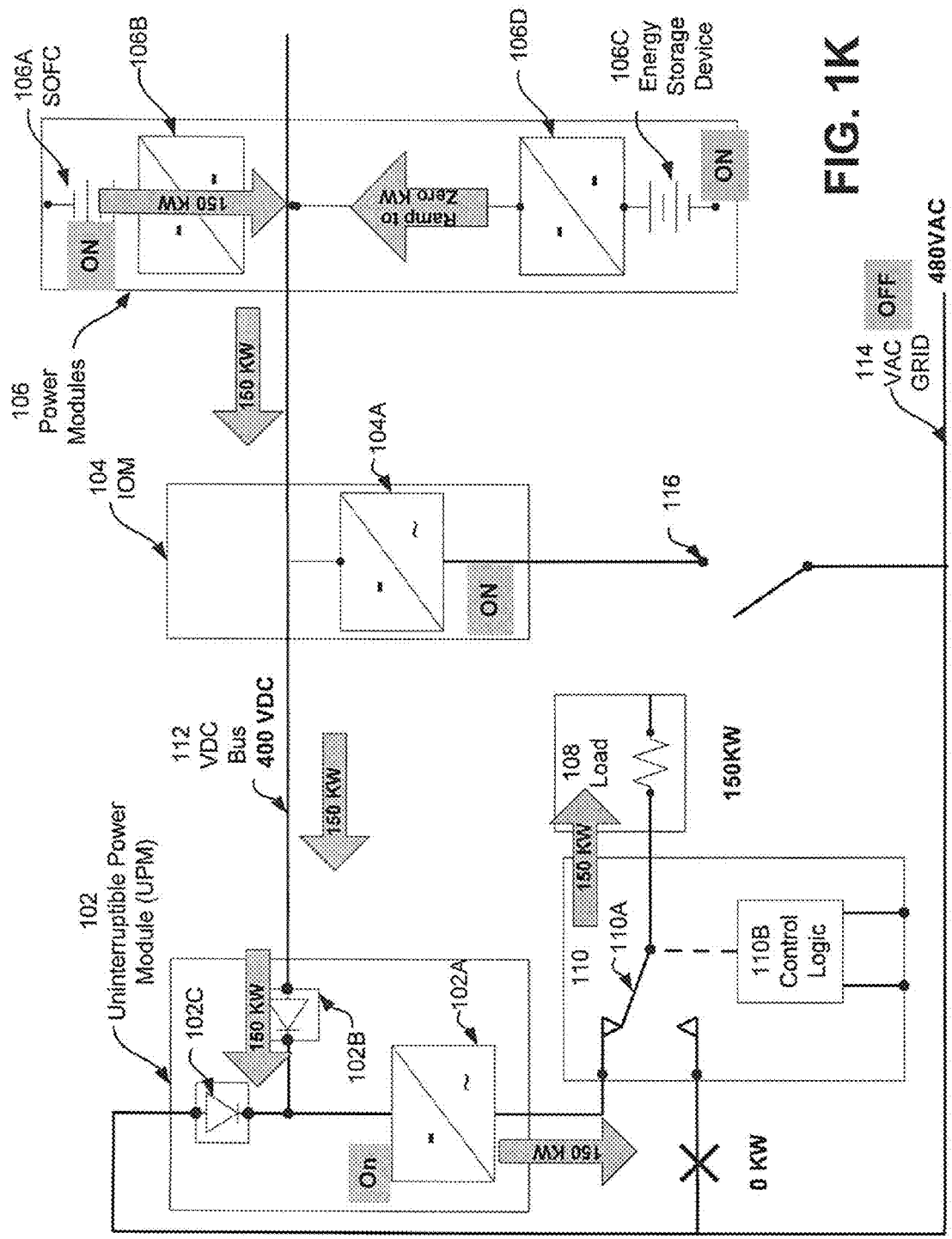

FIG. 1K illustrates operation of the system during loss of power from the grid 114 (e.g., during a black out) and in case of a continuing load transient (e.g., continued increased demand for power from load 108). The operation is the same as that shown in FIG. 1J, except that the power output of the energy storage device 106C is ramped down to zero over time and the power output of the fuel cell segment(s) is ramped up to the power needed by the load (e.g., 150 kW) over the same time. Thus, over time, the load receives more and more power from the fuel cell segment(s) 106A and less and less power from the energy storage device 106C until all of the required power is supplied to the load 108 by the fuel cell segment(s). Thus, the energy storage device acts as a bridging power source during the initial load transient and is then phased out during the continuing load transient.

Figure 2:
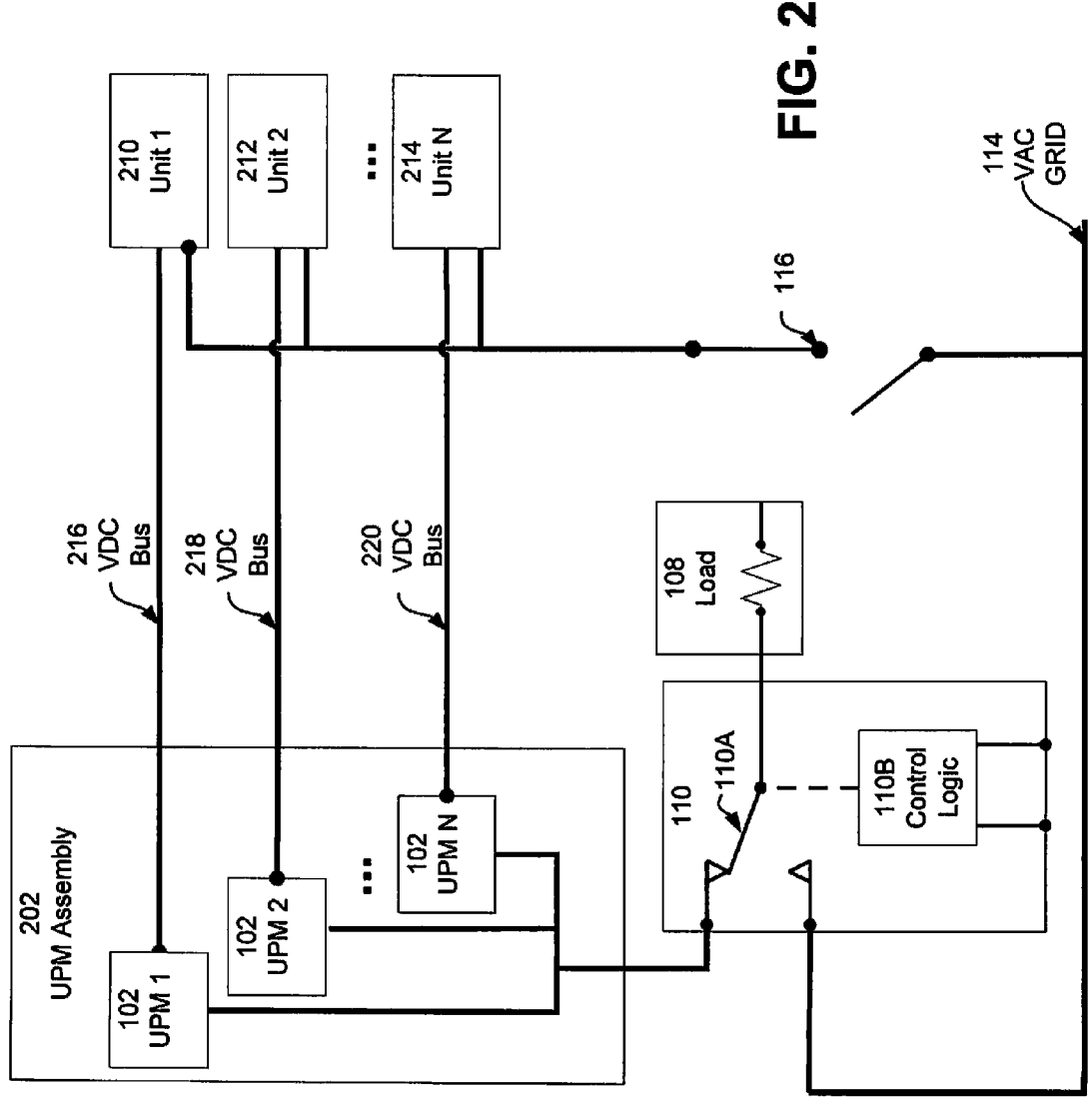
FIGS. 2 and 3 are block diagrams illustrating a DC microgrid according to an embodiment.
Figure 3:
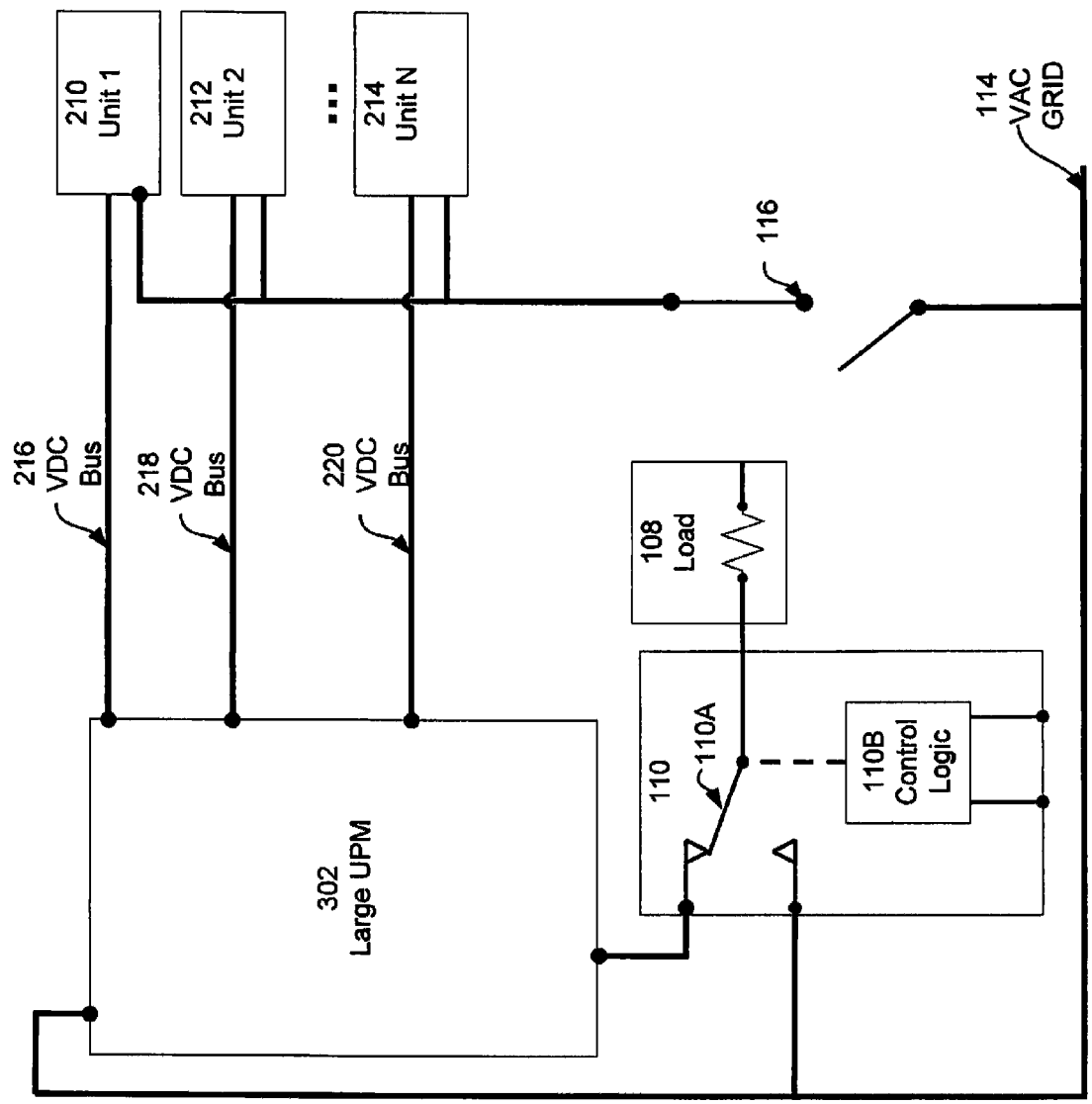

Referring to FIGS. 2 and 3, the output of the DC sources 1 to N (210, 212 and 214) are paralleled at the DC-output point to one or more respective DC buses 216, 218, 220. Each DC source 1 to N may comprise one or more power module(s) 106 and an associated IOM 104. The 1 to N sources feed the customer load via a single UPM 202 assembly. Thus, the plurality of power module/IOM pairs share a common UPM. For example, the DC bus may form a DC micro grid connecting any number of DC sources (e.g., SOFC and power conditioning systems) together at one UPM 202. The UPM 202 may be a large assembly of individual UPM's 102 shown in FIG. 1A capable of output of many multiples of the output of the SOFC systems themselves. As illustrated, in FIG. 2, the UPM 202 assembly comprises "N" UPMs 102 (i.e., one UPM for each DC source), with a separate DC bus (216, 218 and 220) connecting each DC power source 210, 212 and 214 to a dedicated UPM 102. The N UPM's 102 may be arranged in close proximity (e.g., side by side) in one housing or in separate housings to form the UPM assembly 202.

In an alternative embodiment shown in FIG. 3, the assembly 202 of smaller dedicated UPM's 102 may be replaced by one large UPM 302. In this embodiment, the UPM 302 may include an electrical storage device (e.g., bank of batteries or supercapacitors) and/or a synchronous motor (not illustrated in FIG. 3). In general, UPM inverters may include rotating machinery (e.g., a motor, flywheel, etc.) to enhance stored energy content and/or increase reliability and inertia of output.

In summary, the DC sources may comprise fuel cell power modules and an IOM. The inverter within each UPM may be a modular assembly of smaller inverters controlled as one large inverter acting with inputs and/or outputs in parallel. An inverter within the main IOM may be a modular assembly of smaller inverters which are controlled as one large inverter acting with inputs and/or outputs in parallel.

In an embodiment, rectification is provided in the UPM to allow feed from the grid when the stacks are off-line, thus providing the load a protected bus. A boost converter may be used to maintain a good power factor to the grid.

In another embodiment, power from stored energy within an SOFC system or the UPM is used to create a "UPS" unit which has three energy inputs: grid energy; SOFC segment energy; and stored energy (e.g., ultracapacitors or batteries).

In yet another embodiment, a DC micro-grid is connected to other distributed generators such as solar power hardware or wind power hardware.

In an embodiment, the DC micro-grid is connected to DC loads such as the loads of DC data centers or DC vehicle chargers.

In yet another embodiment, when an IOM and UPM are composed of a cluster of inverters acting in parallel, some or all these inverters may be de-energized depending upon customer load conditions. For example, in a 200 kW generation capacity scenario where the customer load is 150 kW, the IOM inverters may be de-energized such that they only support 50 kW instead of a full 200 kW of grid-tied output. Further, in this scenario, it may be that only a portion of the possible inverters in the IOM assembly may be installed into the IOM, thus providing cost savings in terms of equipment required to support the specific customer load scenario.

Figure 4:
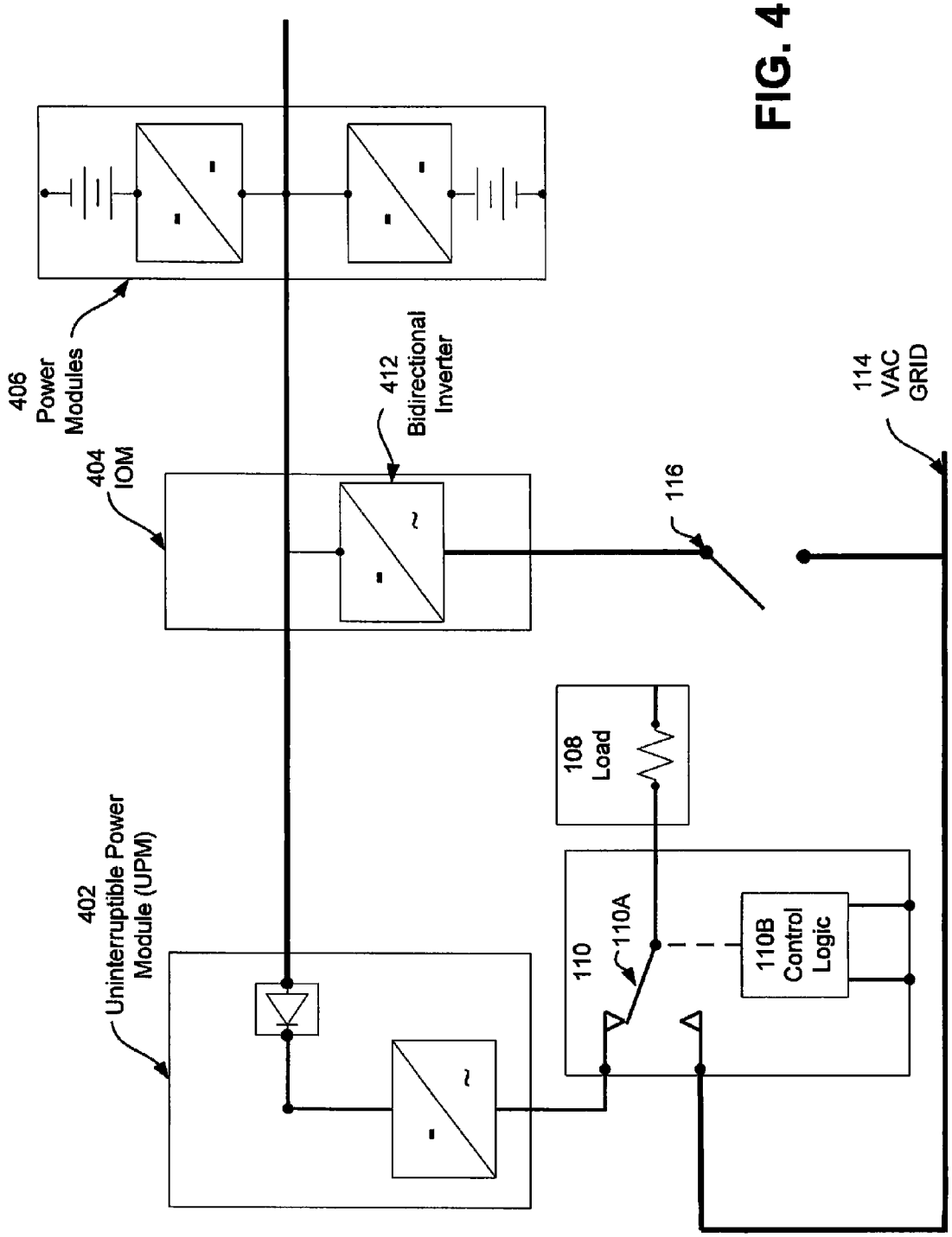
FIG. 4 is a block diagram illustrating an IOM comprising an inverter that is configured for "bi-directional" operation according to an embodiment.

Referring to FIG. 4, in an embodiment, an IOM 404 comprises inverters 412 that are configured for "bi-directional" operation. Such an inverter may have four-quadrant operation. If the grid-tied inverter has "bi-directional" operation, then the rectified feed does not need to be supplied to the UPM 402. Grid power during start-up may come through the grid tied inverter 412 instead of via a rectified input to the UPM 402. This embodiment also provides power from power module(s) 406 for protection of the customer load.

Referring to FIG. 5, in an embodiment, a UPM is not utilized. In this embodiment, an IOM 504 comprises an inverter 512 that is configured for dual mode functionality. The dual mode inverter 512 is configured to operate with a grid reference and also in a stand-alone mode, supporting a customer load without a grid reference. In this embodiment an output power interruption would be required in order to switch between power generation in one mode and another mode.

FIGS. 6A-6D illustrate various modes of operation of the system shown in FIG. 1A in which an electric vehicle (EV) charging module (ECM) is used instead of or in addition to the UPM 102. In some modes of operation the ECM may perform the functions of the UPM.

The systems of FIGS. 6A-6D offer several advantages when used in EV charging application. In particular, these systems remove the need for the grid to supply large peaks of power during quick charging of a large number of EVs. The systems can also be used for EV charging in areas where it would be too expensive to provide grid power, and where it would be more cost effective to lay a natural gas pipeline.

Figure 6A:
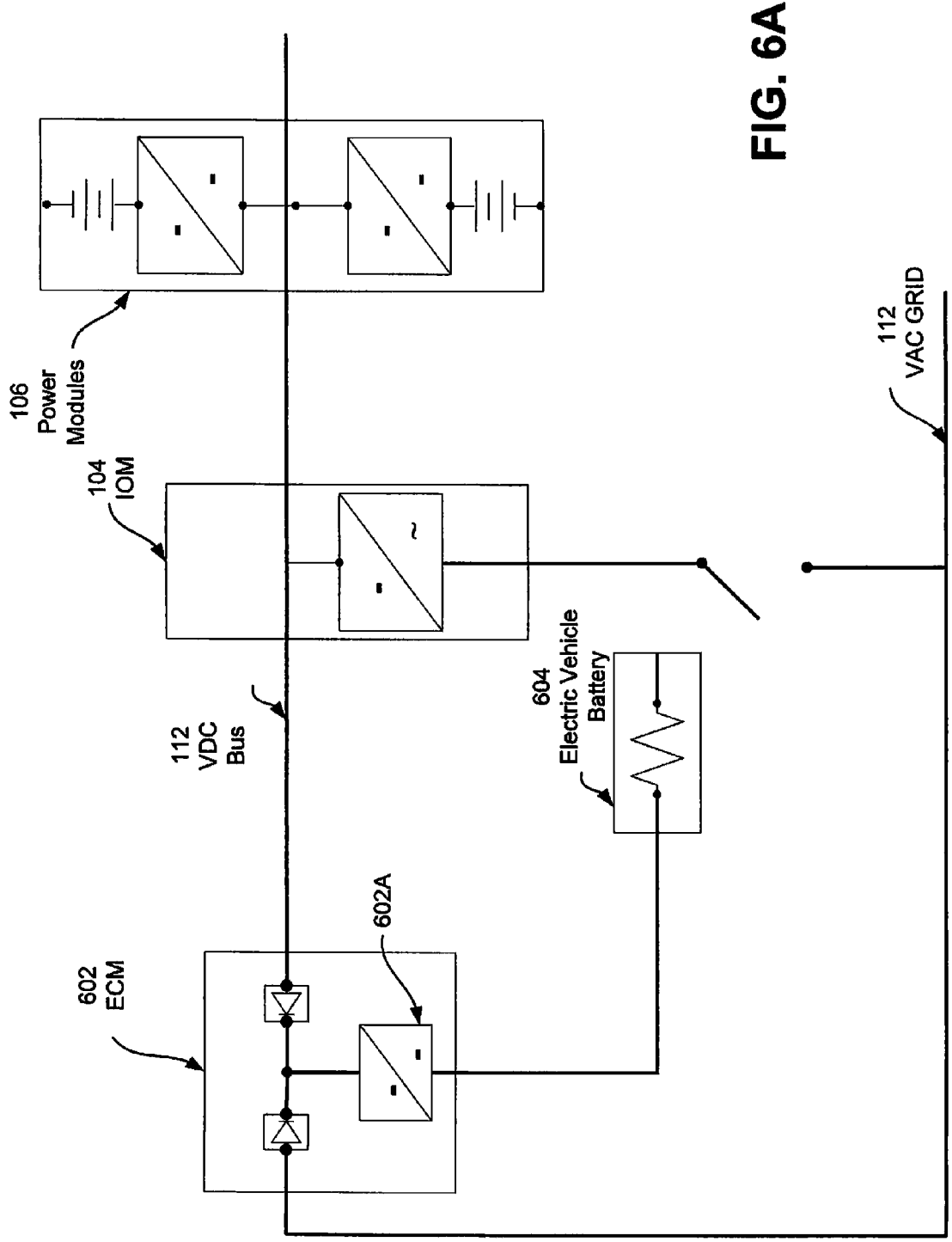

Referring to FIG. 6A, an EV charging station comprises one or more power modules 106, an IOM 104 and an ECM 602. ECM contains a DC/DC converter 602A instead of the inverter 102A of UPM 102. In this embodiment, the EV charging station (e.g., ECM 602) has access to grid power. The EV charging station may feed power simultaneously to the grid and the EV battery. A quick (e.g., 10-20 minute) charge may be provided from ECM 602 to the EV battery 604 using power from the power module 106. Whenever an EV battery 604 is connected to the charging station (e.g., ECM 602) for a charge, the power module 106 power is automatically diverted from feeding the grid into the charging station. The diversion of power from the grid to the EV battery 604 may be accomplished by the control logic as illustrated in FIG. 1A and as discussed previously. The grid power may serve as a backup power for the charging station when the power modules 106 are unavailable.

Figure 6B:
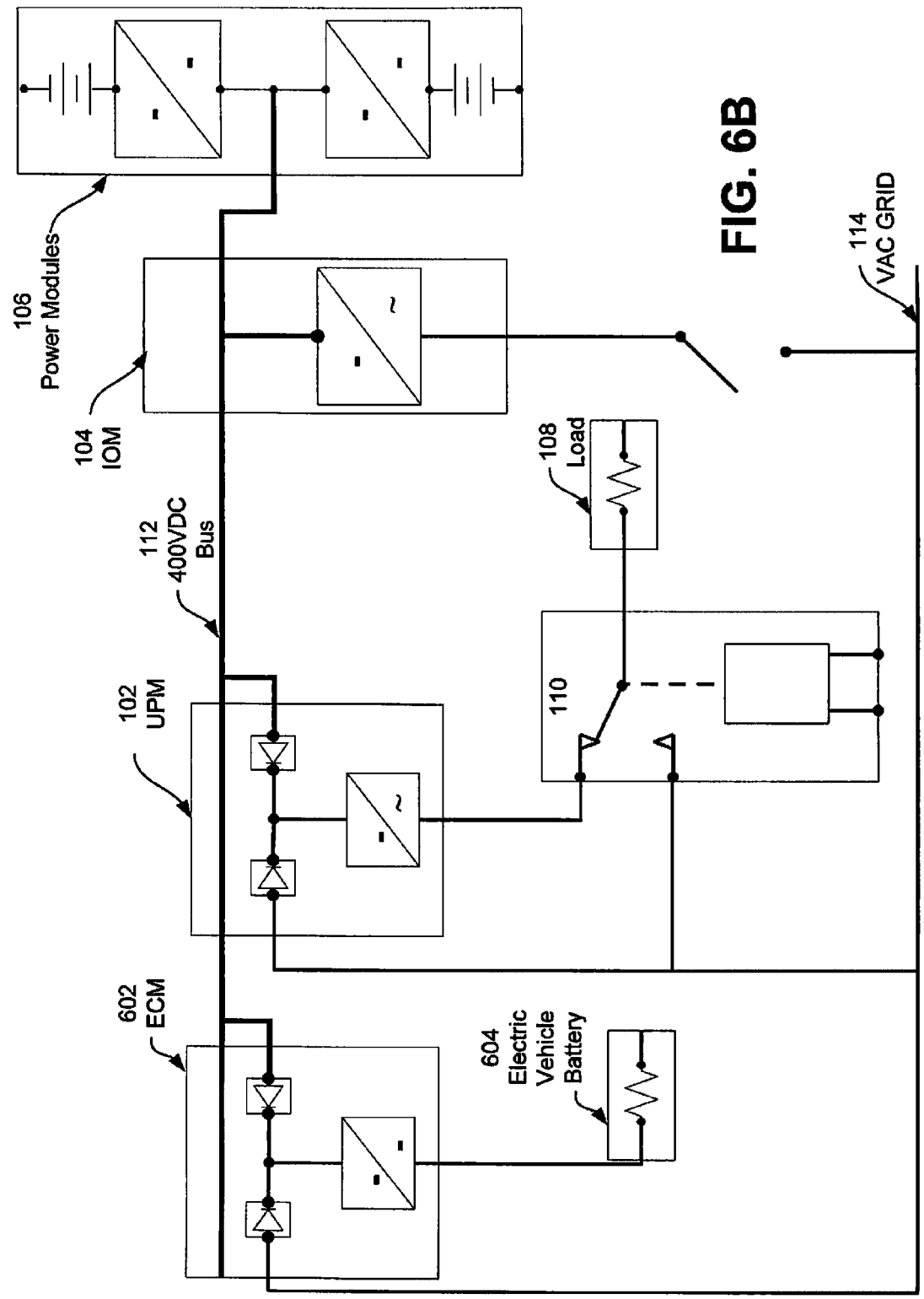

Referring to FIG. 6B, an EV charging station comprises one or more power modules 106, an IOM 104, a UPM 102, control logic unit 110 and an ECM 602. In this embodiment, the EV charging station 602 may also be used to supply a customer load 108 while feeding grid power and charging an EV battery 604. In this configuration, the EV charging station feeds the grid 114 and also provides uninterrupted power to the customer load 108 (such as an office building). The IOM 104 feeds power to the grid 114, while the UPM 102 supplies power to the customer load 108. The ECM 602 acts as the EV charging station and draws power from the 400V DC bus 112. Thus, the UPM 102 and ECM 602 are connected in parallel to the DC bus 112. While the customer load 108 is supplied without interruption, anytime a vehicle drives in to get charged by the ECM 602, a portion of the power being fed to the grid 114 is diverted to the ECM 602 for the time it takes to charge the EV battery 604. Again, this configuration overcomes the challenge of drawing high peak power from the grid 114, which is a major issue today especially during day time, when the grid is already supplying full capacity.

A typical application of this configuration would be to supply power to an office building. The load 108 from the building (including data centers, lighting etc) can be supplied clean uninterrupted power from the UPM 102, while power is being fed to the grid 114. Charging stations can be installed at the car park of this building for the employees and visitors of the company. EV batteries 604 can be charged, and then parked at the car park. Options for both quick charging (1 C) and trickle charging (0.1 C) can be provided at the charging stations, based on the time constraints of the car owner.

Figure 6C:
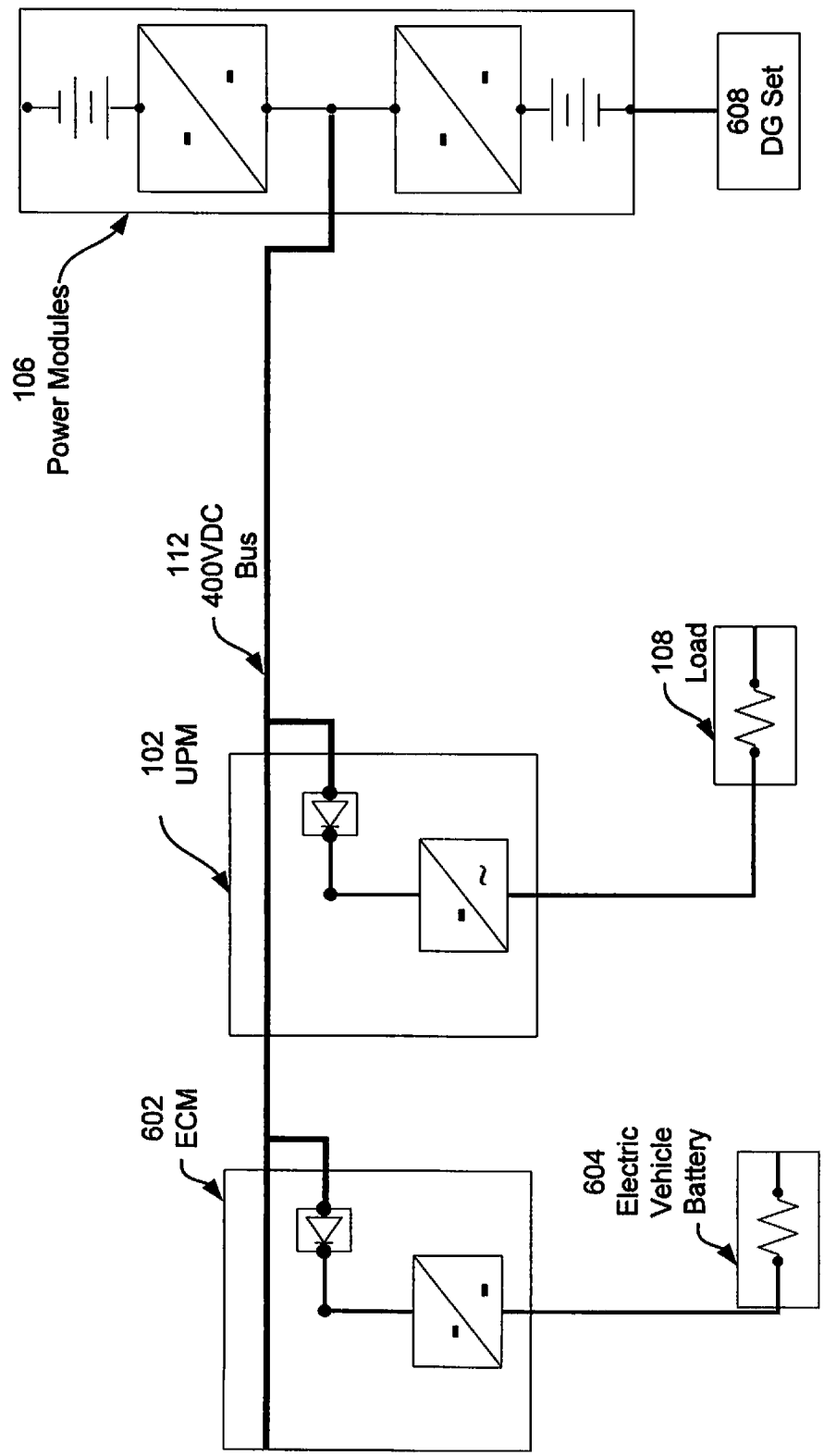

Referring to FIG. 6C an EV charging station comprises one or more power modules 106, a UPM 102, an ECM 602 and a DG set 608. This configuration is suitable for use in remote areas where grid power is not available. In this configuration, the UPM 102 draws power from the DC bus connected to the power modules 106, and feeds the customer load 108. This customer load 108 also acts like a base load to the power modules 106, which allows the system to operate at a certain minimum efficiency (in the configurations illustrated in FIGS. 6A and 6B above, the grid 114 provides the minimum base load for efficient performance). In an embodiment, the power modules 106 and the UPM 102 are rated such that the maximum customer load is always supplied while the ECM 602 is operational. The DG set 608 is used to start up the power modules 106.

Figure 6D:
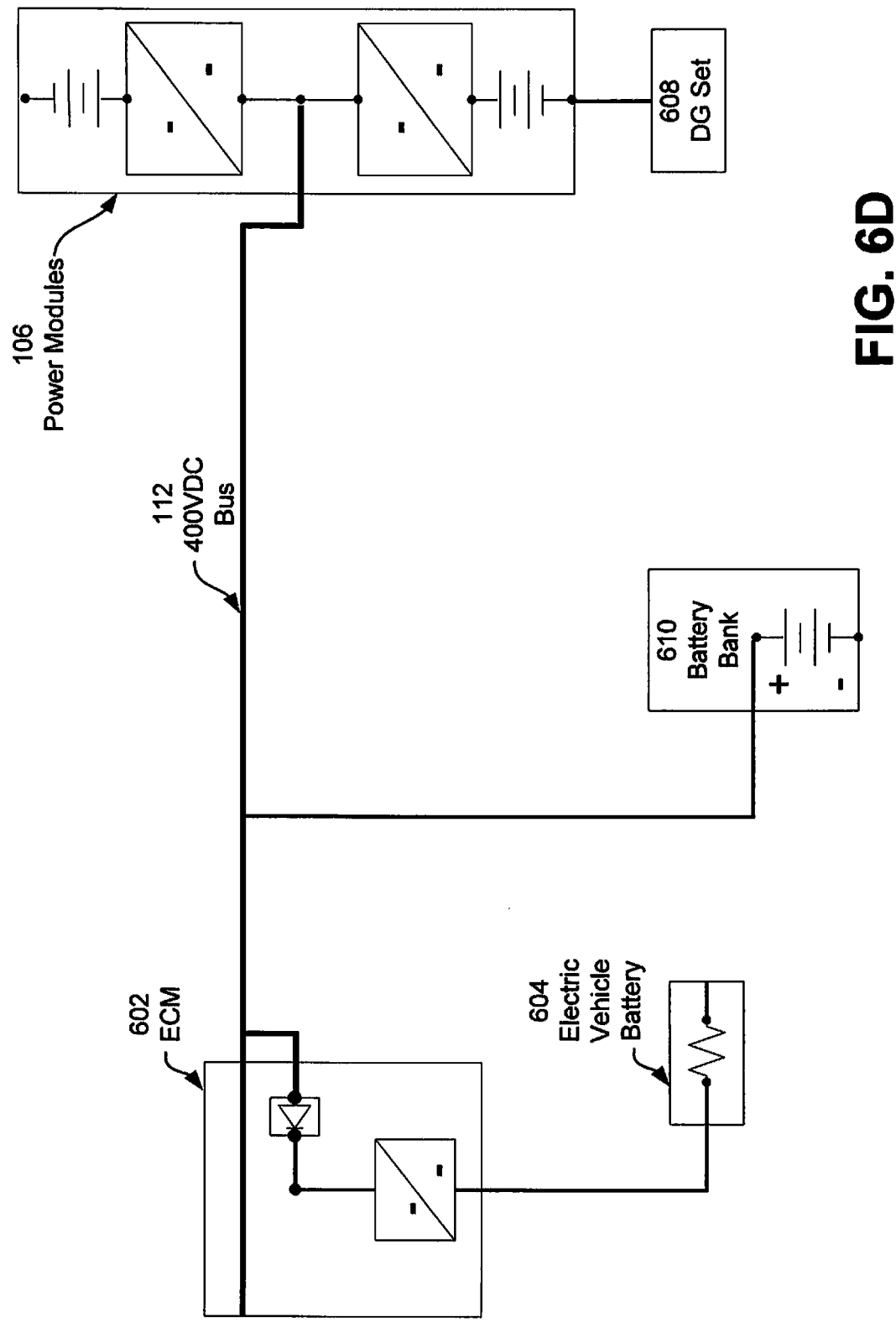

Referring to FIG. 6D, an EV charging station comprises one or more power modules 106 and an ECM 602. This configuration of EV charging stations is suitable for use where there is no grid power and no customer load is to be supplied. The EV charging station is needed only to act as a power source for charging the EV battery 604. In this configuration, a battery bank 610 acts as the base load to the EV charging station. This battery bank 610 may be charged using normal charging (0.1 C). An operator of an EV in need of charging the EV battery 604 may obtain a charge from the ECM 602. Alternatively, the operator may exchange a discharged EV battery 604 for one of the batteries in the battery bank 610. The DG 608 set is used to start up the power modules 106.

In an embodiment, the EV charging station is configured to take advantage of time-of-day pricing and to utilize the storage capacity of the EV batteries. For example, the cost of weekday electricity from 11 AM to 9 PM may be several times (e.g., 5 times) higher than the cost of electricity from 9 PM to 11 AM. In this embodiment, DC power is returned from the EV batteries to the fuel cell system to provide power during peak pricing periods and/or to support shortfalls in the power output from the power modules 106 due to an internal power module 106 fault.

Referring to FIG. 6E, the fuel cell system comprises one or more power modules 106, an IOM 104, a UPM 102, a first control logic unit 110 described above, a second control logic unit 702 containing a switch 702A and second control logic 702B, and an ECM 602. If desired, the control logic 110B and 702B may be physically combined into a single unit which performs the functions of the control logic 110B described above and functions of control logic 702B described below. In this embodiment, the power modules 106, IOM 104 and UPM 102 may be used to supply power to a customer load 108 (e.g., a building, such as an office building) while also being able to provide power to the grid, while the ECM 602 may be used for charging an EV battery 604 by drawing power from the 400V DC bus 112. Control logic unit 110 performs the functions as previously described. Control logic unit 702B performs the functions described below. Thus, the UPM 102 and ECM 602 are connected in parallel to the DC bus 112.

In an embodiment, the UPM 102 (e.g., the inverter 102A of UMP 102) is rated higher than would be required to provide power to load 108 from the power modules 106 alone. The additional power handling capabilities utilize additional DC power from EV batteries that are connected to the EV charging station (i.e., to ECM 602). The control logic unit 702B switches the switch 702A to connect the EV batteries 604 to the ECM 602 to receive power from ECM 602, or to DC bus 112 to provide power to the DC bus 112.

By way of illustration and not by way of limitation, the fuel cell system contains power module(s) 106 which are capable of delivering a first value of maximum power (e.g., 200 kW). The UMP 102 is rated to convert DC to AC to provide a second value of maximum power (e.g., 400 kW AC) which is greater than the first value. In other words, the inverter 102A is designed to convert more DC to AC power than the power module(s) are capable of providing. The UMP 102 uses the additional conversion capacity to convert DC power (e.g., up to 200 kW DC) from the EV batteries 604 to AC power to provide to the load 108 or to the grid 114.

Thus, DC power from an electric vehicle battery 604 is received at an electric vehicle charging module (ECM) 602 during a period of higher electricity price from the grid, the received power is provided to the at least one inverter 102A which converts the received DC power to AC power, and provides the AC power to a load (e.g., 108 or grid load 114).

In one embodiment, DC power is provided from the at least one fuel cell power module 106 to the ECM 602, and then provided from the ECM to the electric vehicle battery 604 when the cost of electricity is lower, prior to the step of receiving DC power.

The combination EV charging station and fuel cell system may be located at a business having employees that drive electric cars. Using the time of day pricing set forth above, these employees would generally park their EVs at the business recharging docks and connect the EV batteries 604 to the ECM 602 for 8 to 10 hours during the work day. Typically, all the EV batteries 604 are fully charged (with the switch 702A connecting batteries 604 to ECM 602) before the price of power from the grid increases (e.g., by 11 AM) using the power provided from the ECM 602. Then, after the price of the grid power increases (e.g., after 11 AM), logic 702B switches the switch 702A position to connect the EV batteries 604 to the DC bus 112. The batteries 604 are then used to provide a portion (e.g., 10-75%, for example 50%) of their stored charge to the DC bus 112. For example, the EV batteries may receive more charge each day (or each week etc.) than they provide back to the DC bus. If desired, the owners of the EVs may not be charged for the net charge they received or be charged a reduced rate compared to the rate for charging EV batteries from the grid. The charging station could then deliver up to 400 kW AC to load 108 in a peak-shaving load-following manner. All parties would financially benefit because of the increased price of the mid-day electricity.

In another embodiment, the electric vehicle battery is charged at a location other than the ECM 602 during a lower cost electricity price period prior to the step of receiving DC power from the ECM 602 during the higher cost of electricity price period. For example, EVs are charged at a remote location (e.g., from the grid at home overnight) using lower cost, night time electricity. These EVs may then be connected to the ECM 602 in the morning. After the price of electricity increases mid-day (e.g., after 11 AM) the EV batteries 604 deliver a predetermined portion of their stored charge to the DC bus 112. Thus bus can then deliver up to 400 kW AC to load 108 in a peak-shaving load-following manner. The EV owners may be reimbursed for the cost of provided power (i.e., for the power they stored at their home and delivered to the bus 112). Here again all parties financially benefit because of the higher price of mid-day electricity.

Of course, the times used in the foregoing examples are for illustrative purposes only. The charging station may be configured to utilize power from the EV batteries to address the time-of-day pricing for the region in which the charging station is located.

The above described methods and systems can be readily used with multiple generators in parallel with a large load, while allowing tight control of frequency and voltage.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Further, words such as "thereafter," "then," "next," etc. are not intended to limit the order of the steps; these words are simply used to guide the reader through the description of the methods.

One or more block/flow diagrams have been used to describe exemplary embodiments. The use of block/flow diagrams is not meant to be limiting with respect to the order of operations performed. The foregoing description of exemplary embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

Control elements may be implemented using computing devices (such as computer) comprising processors, memory and other components that have been programmed with instructions to perform specific functions or may be implemented in processors designed to perform the specified functions. A processor may be any programmable microprocessor, microcomputer or multiple processor chip or chips that can be configured by software instructions (applications) to perform a variety of functions, including the functions of the various embodiments described herein. In some computing devices, multiple processors may be provided. Typically, software applications may be stored in the internal memory before they are accessed and loaded into the processor. In some computing devices, the processor may include internal memory sufficient to store the application software instructions.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some blocks or methods may be performed by circuitry that is specific to a given function.

The preceding description of the disclosed embodiments is provided to enable any person skilled in the art to make or use the described embodiment. Various modifications to these embodiments will be readily apparent to those skilled in the art, and the generic principles defined herein may be applied to other embodiments without departing from the scope of the disclosure. Thus, the present invention is not intended to be limited to the embodiments shown herein but is to be accorded the widest scope consistent with the following claims and the principles and novel features disclosed herein.

What is claimed is:

1. A fuel cell system, comprising:
a power module comprising at least one fuel cell segment;
an input output module comprising at least one first inverter;
an uninterruptible power module comprising at least one second inverter; and
a control logic unit comprising a selective connection mechanism;
wherein:
the at least one fuel cell segment is electrically connected in parallel to the at least one first inverter and the at least one second inverter;
the at least one first inverter is electrically connected to a load through an electrical grid, wherein the at least one first inverter is selectively electrically connected to the electrical grid through a switch;
the at least one second inverter is electrically connected to the load without using the electrical grid;
the control logic unit is configured to selectively electrically connect the electrical grid to the load via configuring the selective connection mechanism into a first position and to selectively electrically connect the at least one second inverter to the load via configuring the selective connection mechanism into a second position; and
the first inverter or the second inverter is configured to receive DC power from an electric vehicle battery located in an electric vehicle at an electric vehicle charging station which is located separately from the electric vehicle, wherein the DC power is received by bypassing an electric vehicle charging module (ECM) of the electric vehicle charging station.

2. The system of claim 1, wherein the power module comprises a first housing, the input output module comprises a second housing which is separate from the first housing, and the uninterruptible power module comprises a third housing which is separate from the first and the second housings.

3. The system of claim 2, wherein the third housing is located adjacent to the load and the first and the second housings are located further from the load than the third housing.

4. A fuel cell system, comprising:
a power module comprising at least one fuel cell segment;
an input output module comprising at least one first inverter and configured for selective connection to an electrical grid through a switch;
an uninterruptible power module comprising at least one second inverter; and
a control logic unit comprising a selective connection mechanism, wherein the control logic unit is configured to selectively electrically connect the electrical grid to a load via configuring the selective connection mechanism into a first position and to selectively electrically connect the at least one second inverter to the load via configuring the selective connection mechanism into a second position;
wherein the first inverter or the second inverter is configured to receive DC power from an electric vehicle battery located in an electric vehicle at an electric vehicle charging station which is located separately from the electric vehicle, wherein the DC power is received by bypassing an electric vehicle charging module (ECM) of the electric vehicle charging station;
wherein the power module comprises a first housing, the input output module comprises a second housing which is separate from the first housing, and the uninterruptible power module comprises a third housing which is separate from the first and the second housings.

5. The system of claim 4, wherein the third housing is located adjacent to the load and the first and the second housings are located further from the load than the third housing.

6. A method of providing electrical power to a load comprising:
receiving DC power at an electric vehicle charging station from an electric vehicle battery located in an electric vehicle at an electric vehicle charging station which is located separately from the electric vehicle, wherein the DC power is received by bypassing an electric vehicle charging module (ECM) in the electric vehicle charging station;

providing the received power to at least one of a first inverter and a second inverter;

converting the received DC power to AC power;

providing the AC power to a load located separately from the electric vehicle;

selectively electrically connecting the first inverter to the load through an electrical grid using a switch;

electrically connecting the second inverter to the load without using the electrical grid;

selectively electrically connecting the electrical grid to the load via configuring a selective connection mechanism into a first position via a control logic unit; and selectively electrically connecting the second inverter to the load via configuring the selective connection mechanism into a second position via the control logic unit.

7. The method of claim 6, further comprising:

providing DC power from the at least one fuel cell power module to the ECM; and providing the DC power from the ECM to the electric vehicle battery prior to the step of receiving DC power.

8. The method of claim 6, wherein the electric vehicle battery is charged at a location other than the ECM prior to the step of receiving DC power.

9. The method of claim 6, wherein the load comprises at least one of a building and the electrical grid.

10. The method of claim 9, wherein the load comprises the building.

11. The method of claim 10, wherein:

the electric vehicle is parked at the electric vehicle charging station;

the electric vehicle charging station provides the DC power from the electric vehicle battery located in the parked electric vehicle to the at least one of the first inverter and the second inverter; and the at least one of the first inverter and the second inverter provides the AC power to the building.

12. The method of claim 11, wherein:

the building which comprises an office building;

the electric vehicle is parked at the office building; and the step of providing the DC power from the electric vehicle battery comprises providing the DC power from the electric vehicle battery which was charged at home during night time to the electric vehicle charging station during day time.

\* \* \* \* \*